US008488726B2

(12) United States Patent
Hueda et al.

(10) Patent No.: US 8,488,726 B2
(45) Date of Patent: Jul. 16, 2013

(54) RECEIVERS BASED ON CLOSED-FORM PARAMETRIC ESTIMATES OF THE PROBABILITY DENSITY FUNCTION FOR THE RECEIVED SIGNAL

(75) Inventors: Mario R. Hueda, Cordoba (AR); Diego E. Crivelli, Cordoba (AR); Hugo S. Carrer, Cordoba (AR); Oscar E. Agazzi, Irvine, CA (US)

(73) Assignee: Clariphy Communications, Inc., Irvine, CA (US)

( * ) Notice: Subject to any disclaimer, the term of this patent is extended or adjusted under 35 U.S.C. 154(b) by 1360 days.

(21) Appl. No.: 11/832,585

(22) Filed: Aug. 1, 2007

(65) Prior Publication Data

US 2012/0275780 A1   Nov. 1, 2012

Related U.S. Application Data

(60) Provisional application No. 60/821,137, filed on Aug. 2, 2006.

(51) Int. Cl.
    *H04B 7/10* (2006.01)
(52) U.S. Cl.
    USPC ........... 375/347; 375/136; 375/262; 375/316; 375/341; 375/346
(58) Field of Classification Search
    USPC ................. 375/136, 147, 229, 259, 262, 265, 375/322, 324, 341, 346, 347, 350
    See application file for complete search history.

(56) References Cited

U.S. PATENT DOCUMENTS

| | | | | |
|---|---|---|---|---|
| 7,376,210 | B2* | 5/2008 | Kim et al. | 375/350 |
| 7,778,312 | B2* | 8/2010 | Cairns et al. | 375/150 |
| 2003/0086515 | A1* | 5/2003 | Trans et al. | 375/346 |
| 2003/0138030 | A1 | 7/2003 | Gavnoudias et al. | |
| 2005/0111591 | A1 | 5/2005 | Gregorius et al. | |
| 2006/0013597 | A1* | 1/2006 | Crivelli et al. | 398/208 |
| 2006/0029157 | A1 | 2/2006 | Dabak et al. | |
| 2006/0193371 | A1* | 8/2006 | Maravic | 375/130 |
| 2006/0227859 | A1* | 10/2006 | Wei et al. | 375/233 |
| 2006/0274861 | A1* | 12/2006 | Langenbach et al. | 375/341 |
| 2007/0033508 | A1* | 2/2007 | Hekstra et al. | 714/795 |
| 2007/0133717 | A1* | 6/2007 | Son et al. | 375/341 |
| 2007/0223563 | A1* | 9/2007 | Perlow et al. | 375/130 |

OTHER PUBLICATIONS

PCT International Search Report and Written Opinion, PCT/US07/75128, Feb. 7, 2008, 8 pages.
Oscar E. Agazzi et al, *Maximum-Likelihood Sequence Estimation in Dispersive Optical Channels*, Journal of Lightwave Technology, Feb. 2005, pp. 749-763, vol. 23, No. 2, USA.

* cited by examiner

*Primary Examiner* — Hirdepal Singh
(74) *Attorney, Agent, or Firm* — Fenwick & West LLP

(57) ABSTRACT

A closed-form parametric approach to channel-estimation is provided. In one aspect, a specific parametric expression is presented for the received signal pdf that accurately models the behavior of the received signal in IM/DD optical channels. The corresponding parametric channel-estimation approach simplifies the design of MLSE receivers. The general technique lends itself well to the estimation of the signal pdf in situations where there are multiple sources of noise with different distributions, such as ASE noise, together with Gaussian and quantization noise, and signal-dependent noise, for example.

43 Claims, 15 Drawing Sheets

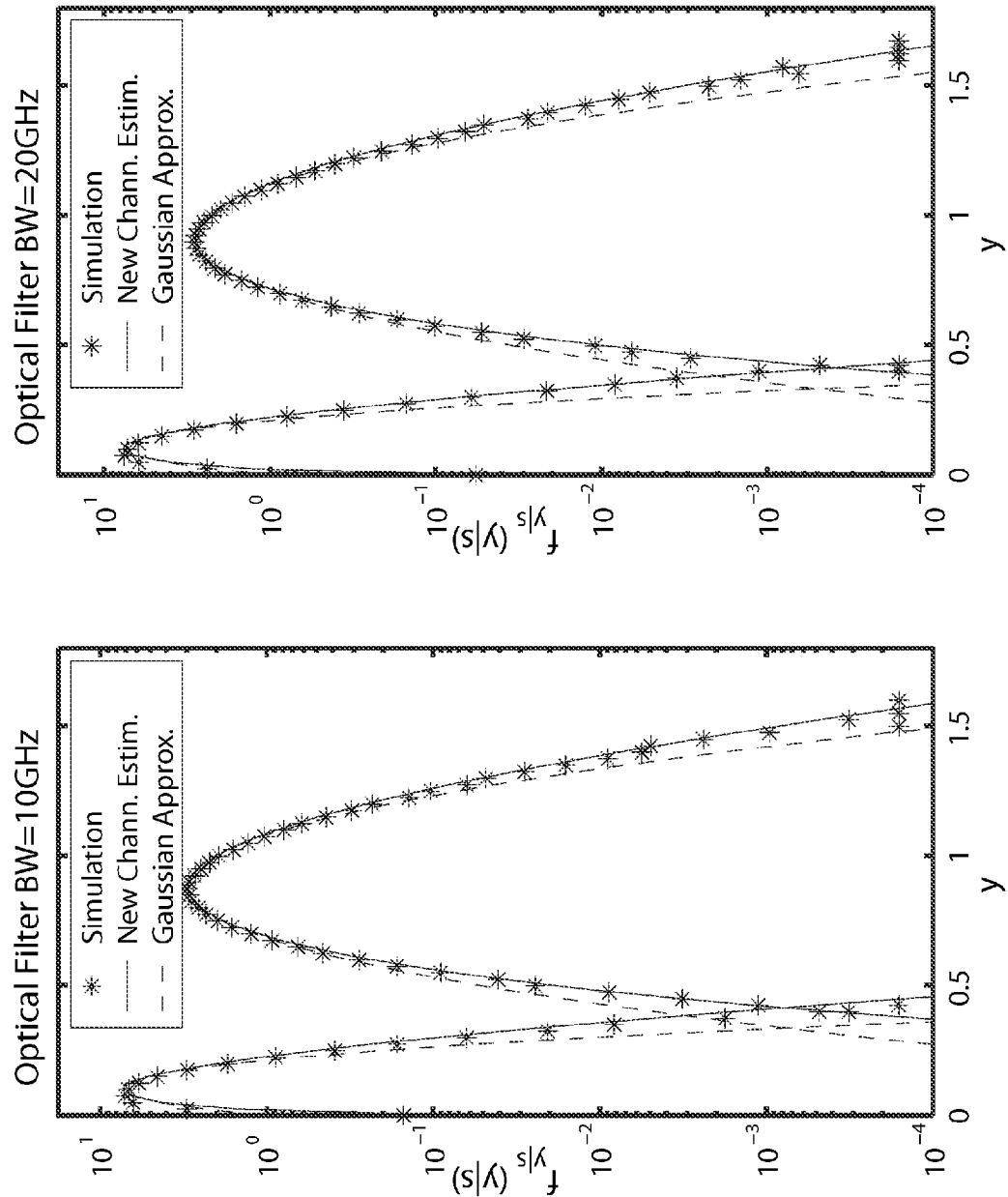

RECEIVED
SAMPLES

↓

1510
ESTIMATE
PARAMETERS
FOR CLOSED-
FORM
PARAMETRIC
CHANNEL
ESTIMATE

↓

1520
EVALUATE
T(.)

↓

1530
COMPUTE
BRANCH
METRICS

FIG. 15

RECEIVERS BASED ON CLOSED-FORM PARAMETRIC ESTIMATES OF THE PROBABILITY DENSITY FUNCTION FOR THE RECEIVED SIGNAL

CROSS-REFERENCE TO RELATED APPLICATION(S)

This application claims priority under 35 U.S.C. §119(e) to U.S. Provisional Patent Application Ser. No. 60/821,137, "Parametric estimation of IM/DD optical channels using new closed-form approximations of the signal pdf," filed Aug. 2, 2006. The subject matter of the foregoing is incorporated herein by reference in its entirety.

BACKGROUND OF THE INVENTION

1. Field of the Invention

This invention relates generally to receivers and, more specifically, to receivers that use closed-form parametric estimates of the channel and/or received signal probability density function.

2. Description of the Related Art

In many situations, receiver performance depends on knowledge about the received signal and/or the channel over which the signal has propagated. For example, in the case of intensity-modulation/direct-detection (IM/DD) optical-transmission systems at speeds of 10 Gb/s and higher, chromatic dispersion and polarization-mode dispersion have become major factors that limit the reach of these systems. Electronic dispersion compensation (EDC) is an increasingly popular approach to mitigate these impairments and a cost-effective alternative to purely optical-dispersion-compensation techniques.

Among EDC techniques, maximum-likelihood sequence estimation (MLSE) is a promising approach. MLSE chooses the sequence that minimizes the negative logarithm of the likelihood function (i.e., the metric). However, MLSE receivers require knowledge of the statistics of the noisy received signal. Noise in IM/DD optical channels is strongly non-Gaussian and signal dependent. Except in the simplest situations, the pdf of the signal corrupted by noise does not have a closed-form expression. This can lead to difficulties in the implementation of the MLSE receiver.

If the signal pdf is not known a priori by the receiver, it must be estimated based on the received signal. This is a process known as channel-estimation. In an EDC receiver implemented as a monolithic integrated circuit, channel-estimation algorithms typically must be implemented by dedicated hardware. The amount of computational resources that can be devoted to channel-estimation is usually limited by constraints on the chip area and power dissipation. Therefore, finding computationally efficient channel-estimation methods is of paramount importance.

Channel-estimation methods can be parametric or nonparametric. Parametric methods assume that the functional form for the pdf of the signal is known but its parameters are not, whereas nonparametric methods do not assume any knowledge of the pdf. The main difficulty with nonparametric methods is that a large number of samples are needed to obtain accurate estimates. This is particularly problematic in the tail regions of the signal pdf, where it may take an inordinate amount of time to obtain enough samples. For this reason, parametric methods are preferable. However, parameter estimation may be difficult if the functional form assumed for the pdf is cumbersome or does not have a closed-form expression, particularly when the estimation must be done by hardware operating in real time, as in the case of an adaptive EDC receiver.

Thus, there is a need for improved, computationally efficient approaches to channel estimation and receivers that depend on channel-estimation.

SUMMARY OF THE INVENTION

The present invention overcomes the limitations of the prior art by providing a closed-form parametric approach to channel-estimation. In one aspect, a specific parametric expression is presented for the received signal pdf that accurately models the behavior of the received signal in IM/DD optical channels. The corresponding parametric channel-estimation approach simplifies the design of MLSE receivers. The general technique lends itself well to the estimation of the signal pdf in situations where there are multiple sources of noise with different distributions, such as ASE noise, together with Gaussian and quantization noise, and signal-dependent noise, for example.

Another aspect of the invention is the computation of bit-error rates (BER), for example for MLSE receivers operating on IM/DD channels. As a specific example, a closed-form analytical expression for the bit-error probability of MLSE-based receivers in dispersive optical channels in the presence of ASE noise and post detection Gaussian noise is presented. Analytical expressions of the BER are useful not only to predict system performance, but also to facilitate the design of channel codes. Numerical simulations demonstrate the accuracy of the closed-form parametric expressions.

One aspect of the invention includes a receiver based on closed-form parametric channel estimation. In one specific embodiment, the receiver includes a parametric channel-estimator, a branch-metric computation unit and a decoder (e.g., a Viterbi decoder). The parametric channel-estimator provides a channel-estimate based on a closed-form parametric model of the channel. The parameters for the model are estimated based on the received signal. The branch-metric computation unit determines branch metrics for each of the possible received bit sequences based in part on the channel-estimate from the parametric channel-estimator, and the decoder determines the received bit sequence based in part on the branch metrics from the branch-metric computation unit. One advantage of closed form parametric estimates is that they typically require fewer computational resources to implement. The parametric approach can also be used in other embodiments for other channels (e.g., noise sources) and/or receiver architectures (e.g., different types of decoders).

Other aspects of the invention include methods and systems corresponding to the devices described above.

BRIEF DESCRIPTION OF THE DRAWINGS

The invention has other advantages and features which will be more readily apparent from the following detailed description of the invention and the appended claims, when taken in conjunction with the accompanying drawings, in which:

FIGS. 9A-9B are graphs of signal pdf's for various channel estimation methods, using realistic filters.

FIG. 15 is a flow diagram for updating the LUTs shown in FIG. 14.

The figures depict embodiments of the present invention for purposes of illustration only. One skilled in the art will readily recognize from the following discussion that alternative embodiments of the structures and methods illustrated herein may be employed without departing from the principles of the invention described herein.

DETAILED DESCRIPTION OF THE PREFERRED EMBODIMENTS

Figure 1:
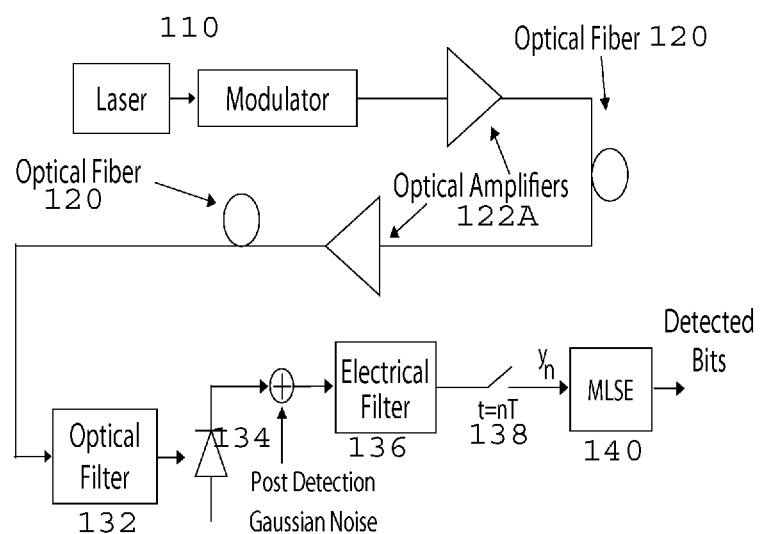
FIG. 1 is a block diagram of an example system suitable for use with the present invention.

Outline
1. MLSE in IM/DD Optical Channels
   1.A. A Closed-Form Approximation for the Signal PDF
   1.B. MLSE Receiver
2. Example Closed-Form Parametric Expression for the Signal PDF
   2.A. Approximating $T_s(\bullet)$ in IM/DD Optical Channels
   2.B. Channel-estimation
   2.C. On the Gaussian Approximation (GA)
3. Accuracy of the Parametric Expression for Signal PDF (22)
   3.A. Measure of the Goodness of PDF Approximations for Metrics Evaluation
   3.B. Channel Estimation in the Presence of Ideal Filters
   3.C. Channel Estimation in the Presence of Ideal Filters and Quantization
   3.D. Channel Estimation in the Presence of Realistic Filters
4. Performance of MLSE in IM/DD Optical Channels
   4.A. Closed-Form Approximation for the Error-Event Probability in Dispersive IM/DD Channels
   4.B. Numerical Results
5. Example Implementations
   5.A. Practical Implementation using the Method of Moments
6. Further Examples 1. MLSE in IM/DD Optical Channels Various aspects of the invention will first be introduced in the context of MLSE receivers for IM/DD systems. FIG. 1 shows a simplified model of such a system. The transmitter 110 modulates the intensity of the transmitted signal using a binary alphabet (e.g., ON-OFF-keying (OOK) modulation).

Let $\{a_n\}=(a_1, a_2, \ldots, a_N)$ and N denote, respectively, the bit sequence to be sent on the optical fiber 120 ($a_n \in \{0,1\}$) and the total number of transmitted symbols. The optical power ratio between the pulses representing a logical 1 and a logical 0, $r_{10}$, is called the extinction ratio. Assume that the intensity level for a logical 0 ($a_n=0$) is different from zero, which is usual in practical transmitters (e.g., $r_{01}=r_{10}^{-1} \approx 0.1$). The optical fiber introduces chromatic dispersion and polarization mode dispersion, as well as attenuation. Optical amplifiers 122 are deployed periodically along the fiber 120 to compensate the attenuation, also introducing ASE (amplified spontaneous emission) noise in the signal. ASE noise is modeled as additive white Gaussian noise in the optical domain. At the receiver 130 (elements 132-140), the optical signal is filtered by optical filter 132 and then converted to a current with a p-i-n diode 134 or avalanche photodetector 134. The resulting photocurrent is filtered by an electrical filter 136. For simplicity, in the following analysis, we use an ideal low-pass optical filter 132 and an integrate-and dump electrical filter 136. The output of the filter 136 is ideally sampled 138 (i.e., with infinite resolution) at the symbol rate 1/T and applied to the MLSE 140.

The received samples can be written as $$y_n = s_n + r_n + z_n = x_n + z_n \quad (1)$$

where $s_n = f(a_n, \ldots, a_{n-\delta+1})$ is the noise-free signal in the electrical domain, which is, in general, a nonlinear function of a group of $\delta$ consecutive transmitted bits (note that $s_n \in S = \{\bar{s}_0, \bar{s}_1, \ldots, \bar{s}_K\}$ with $\bar{s}_0 = f(0, 0, \ldots, 0), \bar{s}_1 = f(0, 0, \ldots, 1), \ldots, \bar{s}_K = f(1, 1, \ldots, 1))$ where $K = 2^{\delta-1}$; $r_n$ are samples of the ASE noise in the electrical domain; $x_n = s_n + r_n$; and $z_n$ are samples of the electrical (thermal) noise, which is modeled as a zero-mean Gaussian random process.

Then, the pdf's of x and z can be expressed as $$f_{x|s}(x|s) = \frac{1}{N_0}\left(\frac{x}{s}\right)^{\frac{M-1}{2}} e^{-\frac{x+s}{N_0}} I_{M-1}\left(\frac{2\sqrt{xs}}{N_0}\right) \quad (2)$$

$$f_z(z) = \frac{1}{\sqrt{2\pi}\sigma_e} e^{-\frac{z^2}{2\sigma_e^2}} \quad (3)$$

where $\sigma_e^2$ is the power of z, $N_0$ is related to the variance of the ASE noise in the optical domain, M is the ratio of the optical to electrical bandwidth of the receiver, and $I_m(\bullet)$ is the $m^{th}$ modified Bessel function of the first kind For convenience, the time index n is omitted. Note that the ASE noise component in the polarization orthogonal to the signal is neglected in (2) and that the chi-square pdf for the ASE noise is not exact in the presence of practical optical/electrical filters. However, the analysis and assumptions presented in the following are still valid, even when practical filters are used.

Since the noise components r and z are independent random variables, the conditional pdf of y can be obtained from (2) and (3) as follows:

$$f_{y|s}(y|s) = f_{x|s}(y|s) \otimes f_z(y), \quad s \in S \quad (4)$$

where $\otimes$ denotes convolution.

1.A. A Closed-Form Approximation for the Signal PDF

The signal pdf (4) does not have a closed-form analytical expression. However, when $r_{01} > 0$ and $N_0$ is sufficiently small, it can be approximated using the following expression for (2):

$$f_{x|s}(x|s) \approx \frac{1}{2\sqrt{\pi \tilde{s} N_0}} e^{-\frac{(\sqrt{x}-\sqrt{\tilde{s}})^2}{N_0}} \quad (5)$$

with $x \geq 0$ and $$\tilde{s} = E_s\{x\} = s + I_{sp} \quad (6)$$

where $E_s\{\bullet\}$ denotes conditional expectation given the noise-free signal level s, and $I_{sp} = E_s\{r_n\} = N_0 M$. When $N_0 \ll s_n$, notice that $\tilde{s} \approx s$. Then, using (5) in pdf (4) and applying the method of steepest descent to approximate the convolution integral, the pdf (4) can be expressed as:

$$f_{y|s}(y|s) \approx G_s e^{-g_s(y)} \quad (7)$$

$$g_s(y) = \frac{(\sqrt{w}-\sqrt{s})^2}{N_0} + \frac{(y-w)^2}{2\sigma_e^2} \quad (8)$$

where $G_s$, is a signal-dependent factor such $\int_{-\infty}^{\infty} G_s e^{-g_s(y)} dy = 1$, while $\omega > 0$ is the value that minimizes (8).

1.B. MLSE Receiver

The maximum-likelihood sequence receiver for signals affected by nonlinear intersymbol interference and additive Gaussian noise consists of a matched-filter bank followed by a Viterbi decoder. It is known that in the case of Gaussian noise, samples of the signal taken at the output of the matched filter at the symbol rate constitute a set of sufficient statistics for the detection. In the case of non-Gaussian and signal-dependent noise, the problem of obtaining a set of sufficient statistics by sampling a filtered version of the input signal at the symbol rate has not been solved. In the following, we assume that the output of the photodetector is filtered and then sampled at the symbol rate, but we do not assume that the input filter is a matched filter bank. We assume that the samples of the signal plus noise are independent, but they are not identically distributed.

The MLSE receiver chooses, among the $2^N$ possible sequences, the one $\{\hat{a}_n\} = (\hat{a}_1, \ldots, \hat{a}_N)$ that minimizes the cumulative metric $$M = \sum_{n=1}^{N} -\ln(f_{y|s}(y_n|\hat{s}_n)) \quad (9)$$

where $\hat{s}_n = f(\hat{a}_n, \ldots, \hat{a}_{n-\delta+1})$. The minimization can be efficiently implemented using the Viterbi algorithm. Whereas in Gaussian channels, the branch metrics are simple Euclidean distances; in these optical channels, the branch metrics require the evaluation of different functions for each branch. This is the result of the fact that the noise is signal dependent. In general, the functions representing the branch metrics do not have a closed-form analytical expression.

2. Example Closed-Form Parametric Expression for the Signal PDF

It is well known from the literature that the random variable y can be transformed into a Gaussian random variable u by using a nonlinear transformation $T_s(\bullet)$ as follows:

$$u = T_s(y) = F_{u|s}^{(-1)}(F_{y|s}(y)) \quad (10)$$

where $F_{u|s}(\bullet)$ and $F_{y|s}(\bullet)$ are the cumulative distribution functions of u and y, respectively, when the noise-free signal s is received. From (10) it is possible to show that $$f_{y|s}(y|s) = \frac{1}{\sqrt{2\pi \zeta_s}} e^{-\frac{1}{2\zeta_s}[T_s(y)-\bar{u}_s]^2} T'_s(y), \forall y. \quad (11)$$

where $T'_s(y) = dT_s(y)/dy$, while $\bar{u}_s$ and $\zeta_s$ and are the mean and variance of u, respectively.

Suppose that y is concentrated near its means $\tilde{s}$ so $f_{y|s}(y|s)$ is negligible outside an interval $(\tilde{s}-\epsilon, \tilde{s}+\epsilon)$ with $\epsilon > 0$, and in this interval, $T'_s(y) \approx T'_s(\tilde{s})$. From the Chebyshev inequality, note that this condition can be verified when the noise power is sufficiently low, that is, $\Pr\{|y-\tilde{s}| \geq \epsilon\} \leq (M_{2,s}/\epsilon^2)$ with $M_{2,s}$ being the conditional second-order central moment of the received signal y. Thus, we can verify that $$E_s\{y\} = \tilde{s} \approx s \quad (12)$$

$$\bar{u}_s \approx T_s(\tilde{s}) \approx T_s(s) \quad (13)$$

$$\zeta_s \approx [T'_s(\tilde{s})]^2 M_{2,s} \approx [T'_s(s)]^2 M_{2,s} \quad (14)$$

$$T'_s(y) \approx T'_s(s) \quad (15)$$

Using (13)-(15), it is simple to show that the generic pdf (11) can be approximated by $$f_{y|s}(y|s) \approx \frac{1}{\sqrt{2\pi M_{2,s}}} e^{-\frac{1}{2\zeta_s}[T_s(y)-T_s(s)]^2} s \in S. \quad (16)$$

Based on (16), we can verify that minimizing the cumulative metric M from (9) is equivalent to minimizing $$\hat{M} = \sum_{n=1}^{N} \frac{1}{2\zeta_{\hat{s}_n}}[T_{\hat{s}_n}(y_n) - T_{\hat{s}_n}(\hat{s}_n)]^2 + \frac{1}{2}\ln(2\pi M_{2,\hat{s}_n}). \quad (17)$$

From (13) and (14) note that, once $T_s(\bullet)$ is known, all parameters required to evaluate (17) can be directly estimated from the input samples.

2.A. Approximating $T_s(\bullet)$ in IM/DD Optical Channels

The exact conditional pdf of the received signal can be written as $$f_{y|s}(y|s) = G_s e^{-g_s(y)} \quad (18)$$

where $G_s$ is a normalization factor, and $g_s(\bullet)$ is a given function. In IM/DD optical channels with combined ASE noise and Gaussian noise, $g_s(\bullet)$ can be accurately approximated by (8). From (16) and (18), note that $$g_s(y) \approx \frac{1}{2\zeta_s}[T_s(y) - T_s(s)]^2. \quad (19)$$

In general, obtaining a simple analytical expression for $T_s(\bullet)$ from (10) or (19) is difficult. However in most cases of interest, it is possible to derive a good approximation by analyzing the properties of $g_s(\bullet)$ and $T_s(\bullet)$. Assuming that $T_s(\bullet)$ is a differentiable increasing function, it can be approximated by $$T_s(y) \approx H_{\Theta_s}(y), s \in S \quad (20)$$

where $H_{\Theta_s}(y)$ is a given differentiable increasing function with unknown parameters defined by the set $\Theta_s$. Additionally, it can be shown that in optical channels with combined ASE noise and post-detection Gaussian noise, $T_s(\cdot)$ is a concave function. Thus, from (20), we conclude that function $H_{\Theta_s}(\cdot)$ should also be concave. Assuming that $r_{01}>0$ and the signal-to-noise ratio (SNR) is sufficiently high (i.e., $\Pr\{y_n<0\}\approx 0$)), we have found that the set of parametric concave functions defined by $$H_{\Theta_s}(y) = y^{v_s}, \quad 0 < v_s \leq 1 \tag{21}$$

with $\Theta_s = \{v_s\}$ is adequate to accurately approximate $T_s(y)$ in transmissions over optical channels. Note that a linear function ($v_s=1$) is both concave and convex. Using (12)-(16) and (21), we obtain the following closed form parametric approximation for the pdf of the received signal:

$$f_{y|s}(y|s) = \frac{v_s s^{(v_s-1)}}{\sqrt{2\pi \varsigma_s}} e^{-\frac{1}{2\varsigma_s}(y^{v_s}-s^{v_s})^2}, \quad s \in S. \tag{22}$$

where $\varsigma_s$ and $v_s$ are defined by (11) and (21).

For combined ASE noise and post-detection Gaussian noise ($\sigma_e>0$, $N_0>0$), note that $\Pr\{y\leq 0\}>0$; thus approximation (21) may not be defined if $v_s<1$. As we shall show later, this problem can be overcome by adding an appropriate constant $y_c$ to the input signal and neglecting the negative values of $y+y_c$.

2.B. Channel-estimation

Parameters $N_0$, $\sigma_e^2$, M, and set S can be obtained by using the method of moments (e.g., see O. E. Agazzi, et al., "Maximum Likelihood Sequence Estimation in Dispersive Optical Channels," J. Lightwave Technology, vol. 23 no. 2, pp. 749-763, February 2005, which is incorporated by reference herein). The sets of parameters $\{v_s\}$ and $\{\varsigma_s\}$ with $s \in S$ can be calculated as follows. Since $u=y^{v_s}$ is approximately a Gaussian random variable with mean $\bar{u}_s$, its third-order central moment $\eta_s$ should be zero for the optimal value of $v_s$, that is $$\eta_s = E\{(y^{v_s}-\bar{u}_s)^3\} = 0. \tag{23}$$

A simple iterative algorithm can be used to look for the value of $v_s$ that minimizes $|\eta_s|$. The third-order central moment $\eta_s$ can be numerically evaluated by using the signal pdf (4).

In the case of IM/DD optical channels with combined ASE noise and Gaussian noise, $v_s$ can be estimated directly from the central moments of y as follows:

$$v_s \approx 1 - \frac{2}{3}\frac{sM_{3,s}}{M_{4,s}-M_{2,s}^2}, \quad s \in S \tag{24}$$

where $M_{3,s}$ and $M_{4,s}$ are the conditional third and fourth-order central moments of the received signal y, respectively. From (24), both Gaussian noise ($\sigma_e>0$, $N_0=0$) and ASE noise ($\sigma_e=0$, $N_0>0$) are special cases of (22):

Gaussian noise: $\varsigma_s = \sigma_e^2$, $v_s = 1$, $y \in \mathbb{R}$ \hfill (25)

ASE noise: $\varsigma_s = \frac{N_0}{2}$, $v_s = 0.5$, $y > 0$.

Once $v_s$ is estimated, parameters $\varsigma_s$ and $\bar{u}_s$ can be obtained from (13) and (14) as follows:

$$\bar{u}_s \approx s^{v_s} \tag{26}$$

$$\varsigma_s \approx v_s^2 s^{2(v_s-1)} M_{2,s}. \tag{27}$$

2.C. On the Gaussian Approximation

When the SNR is sufficiently high, the term between brackets in the exponent of (16) can be approximated by $$T_s(y) - T_s(s) \approx (y-s)T'_s(s). \tag{28}$$

Then, from (14) and (28), it can be shown that the generic pdf (16) results in $$f_{y|s}(y|s) \approx \frac{1}{\sqrt{2\pi M_{2,s}}} e^{-\frac{1}{2M_{2,s}}(y-s)^2}, \quad s \in S \tag{29}$$

and therefore, the generic pdf (16) reduces to the Gaussian approximation.

3. Accuracy of the Parametric Expression for Signal PDF (22)

Approximation (16) for the generic pdf is valid when the noise power is sufficiently low, such that conditions (13)-(15) are satisfied. On the other hand, the validity of $T_s(y) \approx y^{v_s}$ for IM/DD optical channels depends directly on the accuracy of (5), which has been found to be satisfactory when $r_{01}>0$ and OSNR$\geq$5 dB. Our results show that the parametric expression (22) is satisfactory even at high extinction ratios such as $r_{10}=13$ dB.

Next, we explore the accuracy of parametric channel estimation (22) in IM/DD optical channels with combined Gaussian and ASE noise. We consider optical channels with dispersion parameters D=1700, 3400, and 5100 ps/nm, which correspond, for example, to 100 km ($2^\delta=8$), 200 km ($2^\delta=32$), and 300 km ($2^\delta=128$) of SSMF, respectively. SSMF is Standard Single-Mode Fiber, as specified by the International Telecommunications Union (ITU) Recommendation G.652. This is used in the third telecommunications window (1550 nm), which leads to a dispersion parameter of 17 ps/nm/km. The data rate is 10 Gb/s and the transmitted pulse shape has an unchirped Gaussian envelope $\exp(-t^2/2T_0^2)$ with $T_0=36$ ps. We assume that the MLSE-based receiver has enough states to compensate the total memory of the channel (i.e., $2^{\delta-1}$ states).

3.A. Measure of the Goodness of PDF Approximations for Metrics Evaluation

We introduce the average metric error (AME): a quantity that is better suited to assess the accuracy of branch-metric approximations in Viterbi decoders.

Let $f_{y|s}(y)$ and $\hat{f}_{y|s}(y)$ be the true signal pdf and its estimate, respectively. We divide the interval of interest of y into $N_y$ equidistant points $Y=\{\bar{y}^{(k)}\}$, $k=1,\ldots,N_y$. Then, we define the AME as $$AME = \frac{1}{2^\delta N_y}\sum_{\bar{s}_i \in S}\sum_{\bar{y}^{(k)} \in Y}\left|\ln\frac{\hat{f}_{y|s}(\bar{y}^{(k)}|\bar{s}_i)}{f_{y|s}(\bar{y}^{(k)}|\bar{s}_i)}\right|. \tag{30}$$

Note that the AME is nonnegative and equal to zero if and only if $\hat{f}_{y|s}(\bar{y}^{(k)}|\bar{s}_i) = f_{y|s}(\bar{y}^{(k)}|\bar{s}_i)$, $\forall \bar{y}^{(k)} \in Y$, $\forall \bar{s}_i \in S$. Thus, the accuracy of the pdf approximation improves as AME$\rightarrow 0$.

3.B. Channel Estimation in the Presence of Ideal Filters

Let $\bar{S}_0$ and $\bar{S}_1$ be the currents generated by each constellation symbol in a nondispersive optical channel ($\bar{S}_0+\bar{S}_1=1$). Then, we define Extinction Ratio:

$$r_{01} = r_{10}^{-1} = \frac{\bar{S}_0}{\bar{S}_1} \quad (31)$$

Optical Signal-to-Noise Ratio:

$$OSNR = \frac{\bar{S}_1}{2I_{sp}} \quad (32)$$

Signal-to-Gaussian-Noise Ratio:

$$SGNR = \frac{1}{2^\delta \sigma_e^2} \sum_{\bar{s}_i \in s} \bar{s}_i^2 \quad (33)$$

Figure 2:
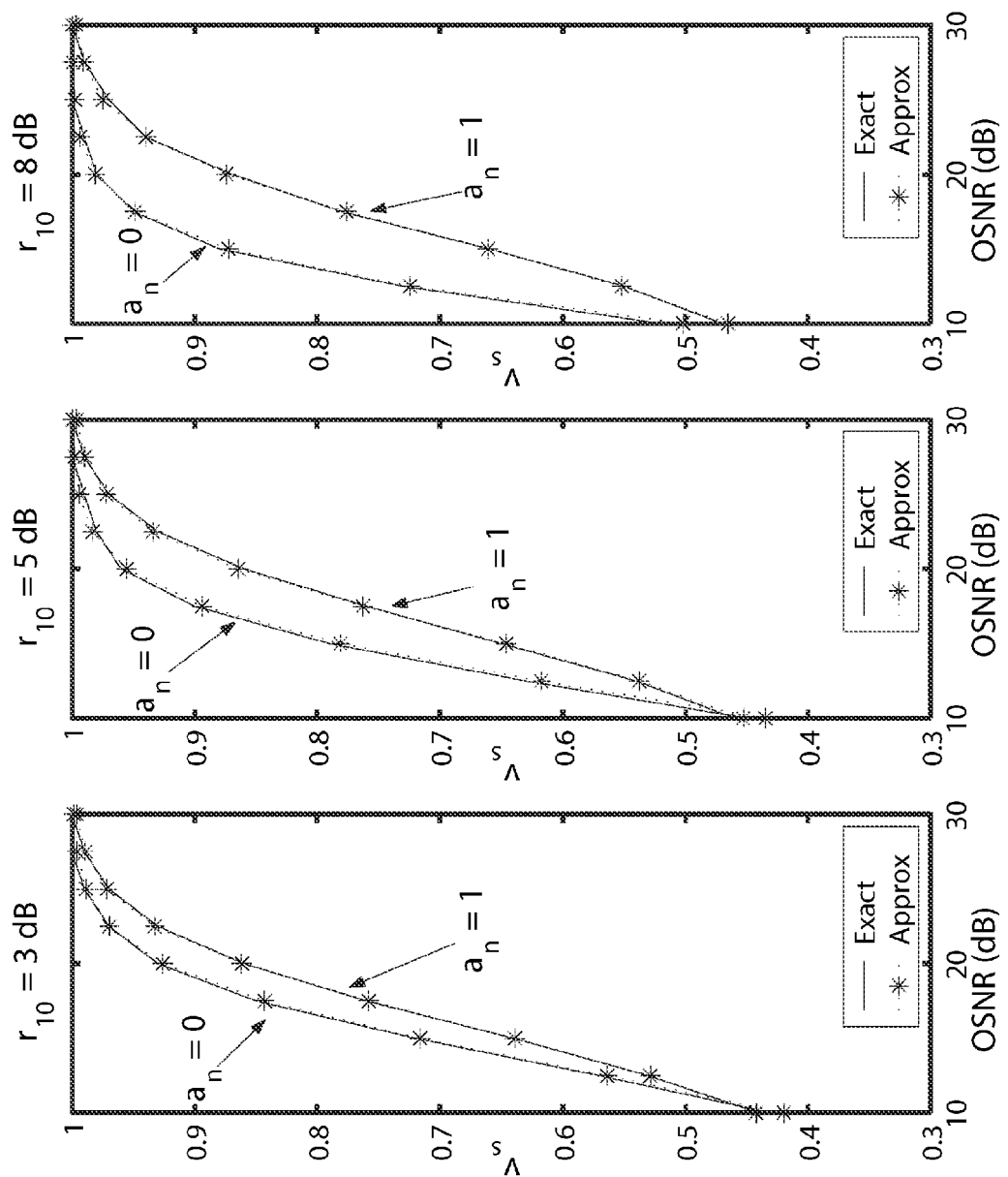
FIGS. 2A-2C are graphs of parameter $v_s$, as a function of OSNR for different values of $r_{10}$.

FIGS. 2A-2C shows the parameter $v_s$ as a function of OSNR in a nondispersive optical channel. We use $\bar{y}_c = 5\sigma_e$, SGNR=20 dB, M=3, and several values of $r_{10}$. We present results derived from both the iterative method based on (23) (solid lines) and the approximation given by (24) ("*"). In all cases, (24) is accurate in estimating parameter $v_s$.

Figure 3:
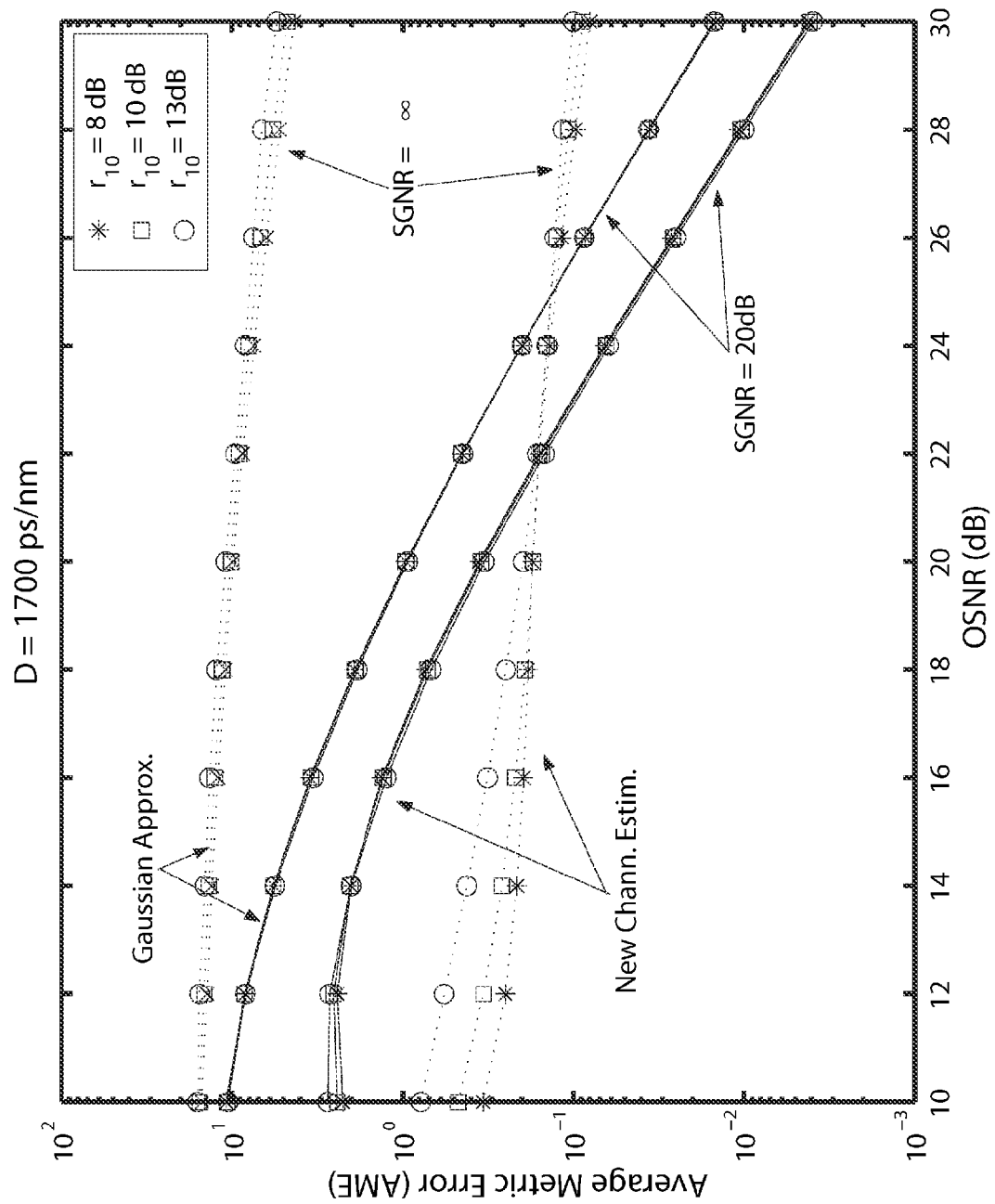
FIG. 3 is a graph of AME as a function of OSNR, for various channel estimation methods, values of SGNR and values of $r_{10}$.

FIG. 3 shows the AME versus the OSNR for D=1700 ps/nm ($2^\delta$=8), Y=[-2, 5], $N_y = 2^{12}$, M=3, two values of SGNR=20 dB and ∞, and three values of $r_{10}$. The two sets of solid curves correspond to SGNR=20 dB, with the upper set corresponding to the Gaussian approximation and the lower set corresponding to the parametric estimate (22). Each set of curves includes three curves, corresponding to three different values of $r_{10}$. In this and other figures, the curves for the parametric estimate (22) may be labeled as the new approach or the new channel estimate. The two sets of dotted curves correspond to SGNR=∞, again with the upper set corresponding to the Gaussian approximation and the lower set corresponding to the parametric estimate (22). In these calculations, the true pdf (as required to calculate the AME) is obtained by numerical integration of (4). Parameters $v_s$ and $\zeta_s$ are estimated as described above.

Figures 4A, 4B:
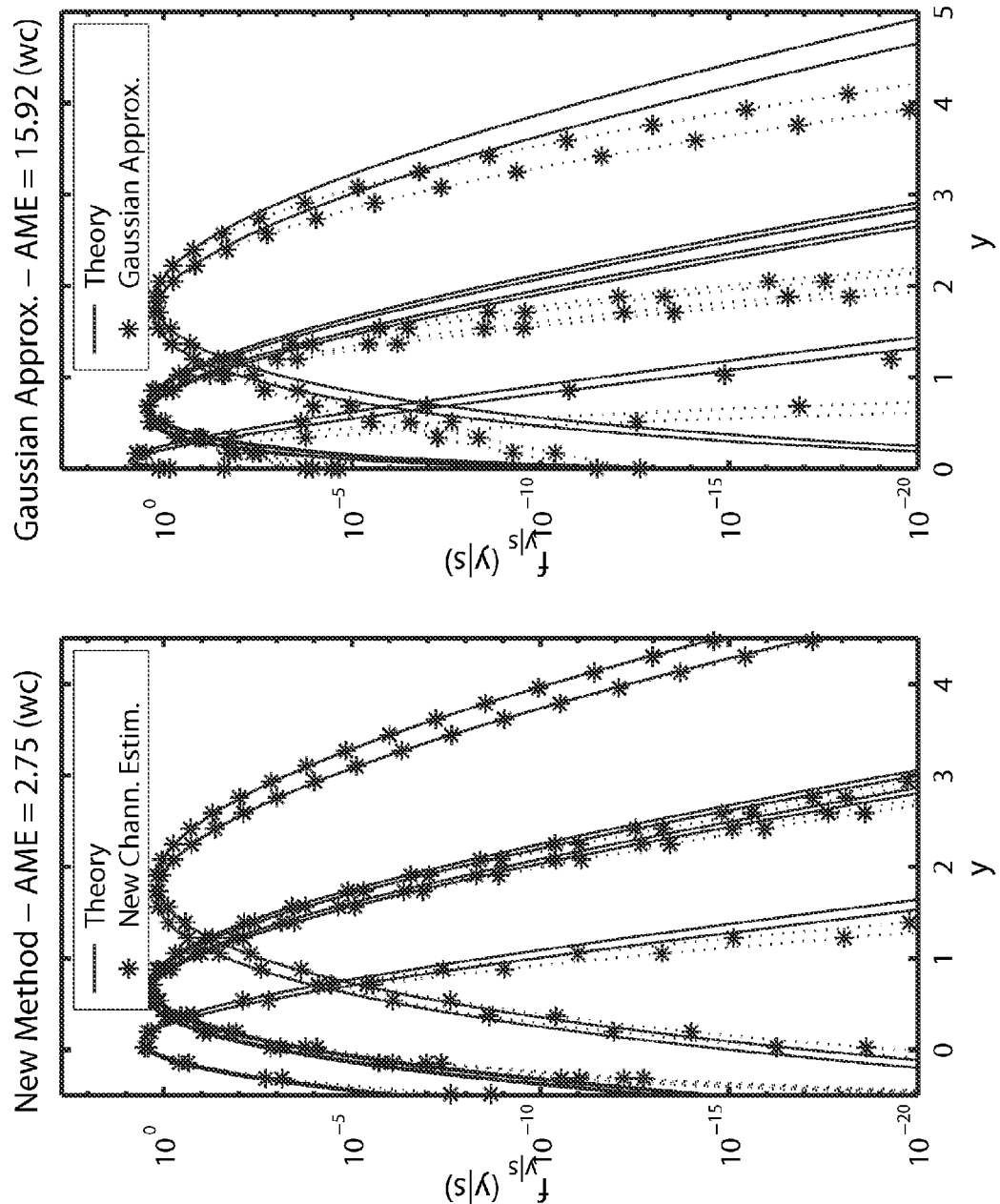
FIGS. 4A-4B are graphs of the signal pdf, for various worst case scenarios.

FIGS. 4A and 4B show the received signal pdf's for the worst cases (wcs) found for the parametric estimate (22) and the Gaussian approximation, respectively. In all cases of FIGS. 3 and 4, the parametric estimate (22) out-performs the Gaussian approximation, particularly in the presence of dominant ASE noise.

Figures 5A, 5B:
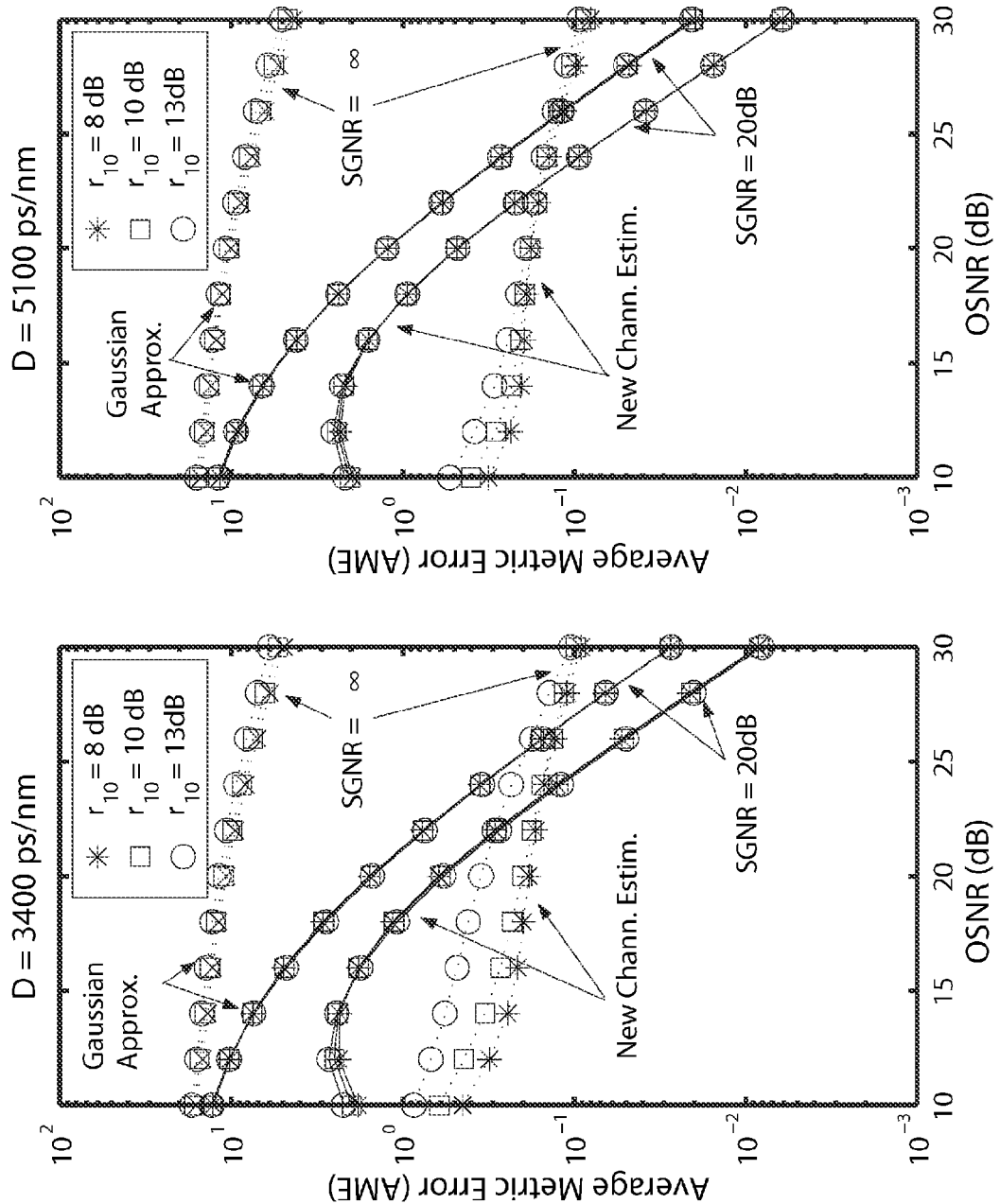
FIGS. 5A-5B are graphs of AME as a function of OSNR, for various channel estimation methods, values of SGNR and values of $r_{10}$.

Similar results are observed in FIGS. 5A and 5B. FIG. 5A considers a dispersive optical channel with D=3400 ps/nm ($2^\delta$=32) and FIG. 5B considers a dispersive optical channel with D=5100 ps/nm ($2^\delta$=128). In both these figures, the solid curves correspond to SGNR=20 dB and the dotted curves to SGNR=∞. Again, the upper set of curves corresponds to the Gaussian approximation and the lower set to the parametric estimate (22).

Figures 6A, 6B:
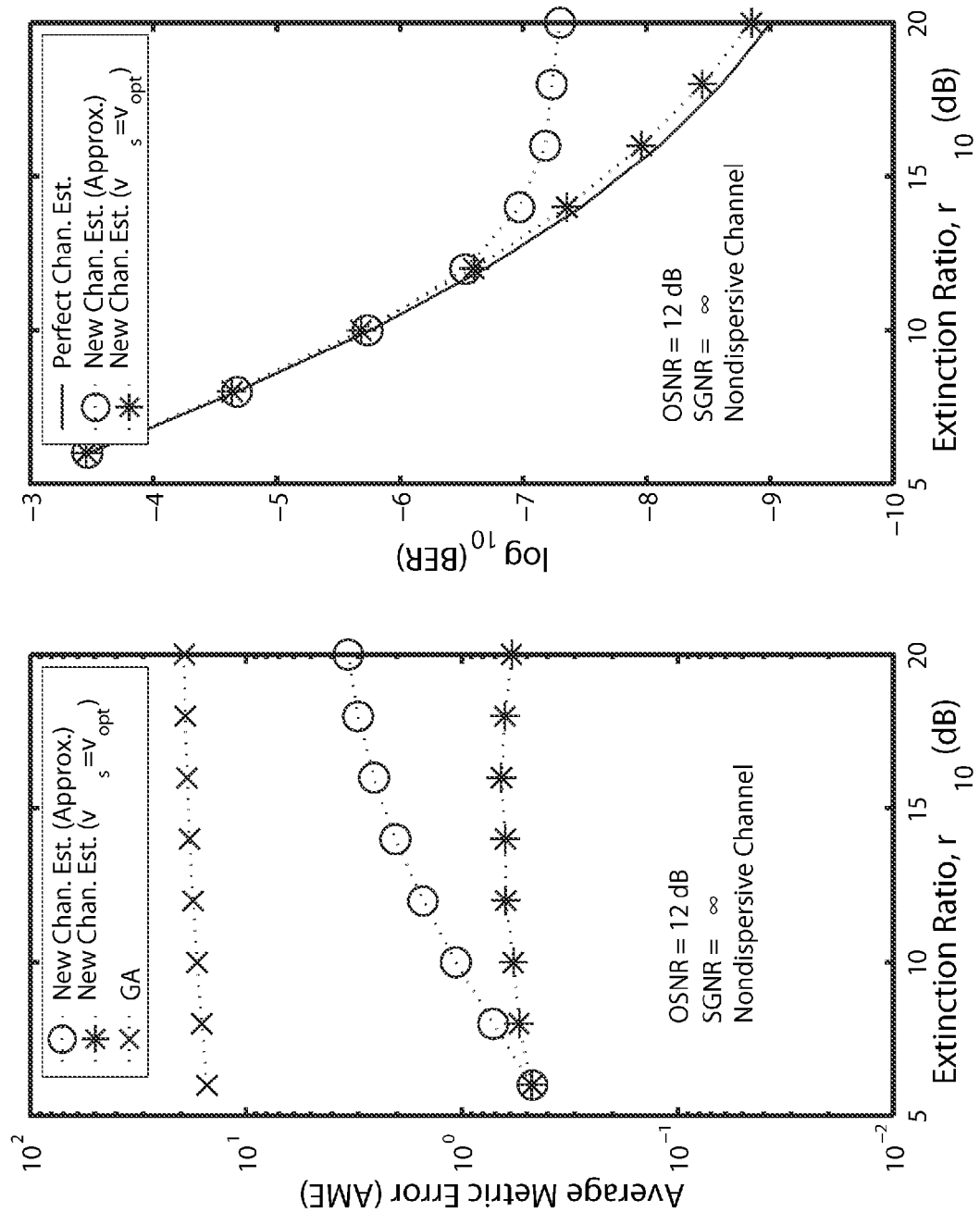
FIG. 6A is a graph of AME as a function of the extinction-ratio $r_{10}$ for various channel estimation methods.
FIG. 6B is a graph of BER as a function of $r_{10}$ for various channel estimation methods.

FIG. 6A shows AME versus the extinction-ratio $r_{10}$ for a nondispersive channel with M=3, OSNR=12 dB, and SGNR=∞. We present results for both the parametric channel-estimate (22) and the Gaussian approximation with the true pdf given by (2). Two estimates for parameter $v_s$ are considered: 1) $v_s = v_{opt}$, where $v_{opt}$ is the value that minimizes the magnitude of the third-order central moment defined by (23) ("*") and 2) approximation (24) ("○").

FIG. 6B shows BER versus $r_{10}$ for a perfect channel estimation and for the parametric estimate (22). The good behavior of the latter with $v_{opt}$ is verified from this figure. Note that the accuracy of approximation (24) degrades significantly at high values of $r_{10}$. Nevertheless, from FIG. 6B, we realize that approximation (24) can be used with satisfactory results in MLSE receivers over optical channels with $r_{10} \leq 10$ dB.

3.C. Channel Estimation in the Presence of Ideal Filters and Quantization

Now consider the effects of quantization on the accuracy of the channel estimation. Let y' and Δ be the quantized output and the quantization step ($\Delta \propto 2^{-L}$), respectively. The pdf of y' is discrete and equal to the Δ-spaced samples of the smooth pdf of the signal $$y = x + z + q \quad (34)$$

where x and z are defined in (1), and q is an independent uniformly distributed random variable with pdf $f_q(q) = 1/\Delta$, $-\Delta/2 \leq q \leq \Delta/2$. Note that x, z, and q are independent random variables, then the smooth pdf is $$f_{y|s}(y|s) = f_{x|s}(y|s) \otimes f_z(y) \otimes f_q(y), \, s \in S. \quad (35)$$

The discrete pdf of the quantized output y' is given by the samples of the smooth pdf (35). Therefore, it is useful to investigate how accurately the proposed method approximates (35).

Figures 7A, 7B:
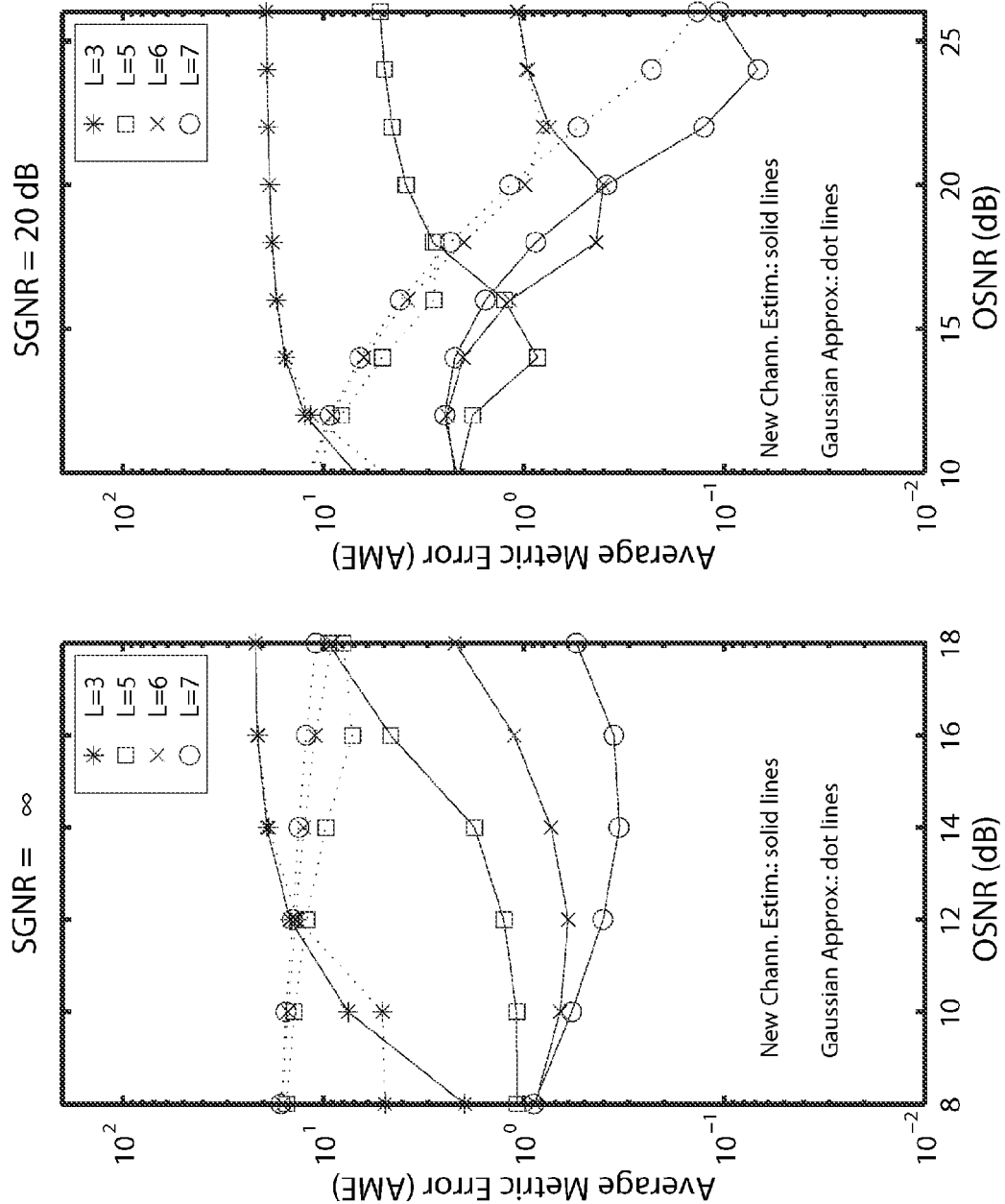
FIGS. 7A-7B are graphs of AME as a function of OSNR, for various channel estimation methods, values of SGNR and values of L.

FIGS. 7A-7B show the AME for different values of L with the true pdf (35). We consider D=5100 ps/nm (i.e., 300 km of SSMF), $2^\delta$=128, SGNR=20 dB and ∞ (FIGS. 7A and 7B, respectively), M=3, and $r_{10}$=10 dB. Parameters $v_s$ are estimated as described previously with the central moments numerically evaluated from the smooth pdf (35). We note that the parametric estimate provides significant improvements in accuracy over the Gaussian approximation for L=5 or higher.

Figures 8A, 8B:
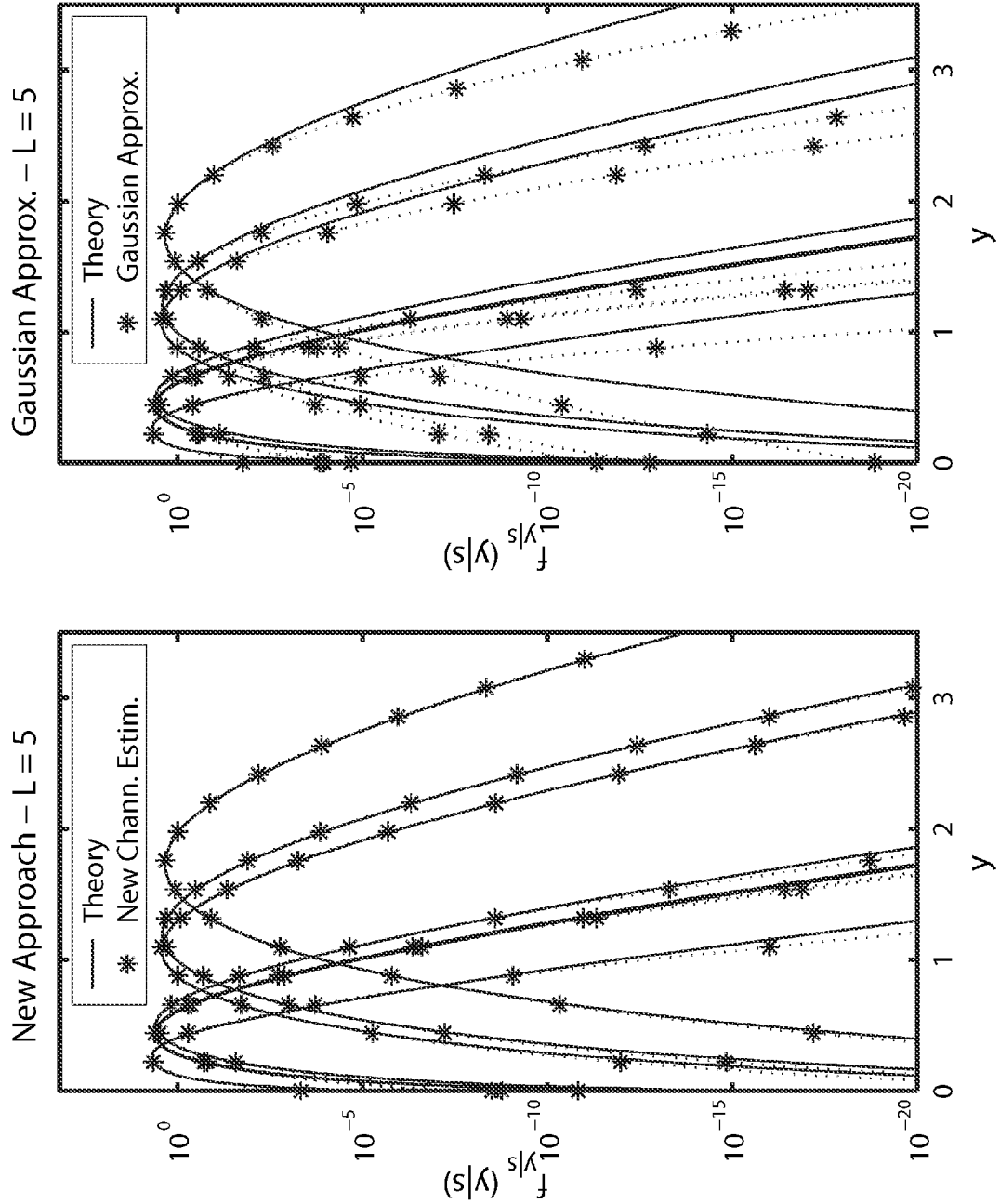
FIGS. 8A-8B are graphs of signal pdf's for the parametric channel estimate and Gaussian approximation, respectively.

This can also be observed in FIGS. 8A-8B, where we show pdf's for a reduced set of the $2^\delta$=128 signal levels, with L=5, OSNR=12 dB, and SGNR=∞. From FIG. 7, we also observe that the accuracy of the parametric estimate degrades at high OSNR and low bit resolution. This is because the transformation $T_s(\bullet)$ cannot be assumed concave when the noise q is dominant (e.g., small value of L). Therefore, the accuracy of (21) degrades. Numerical results show that the generic pdf approximation (16) with the exact $T_s(\bullet)$ numerically computed from (10) and (35) achieves good accuracy even for a number of bits as small as L=3. Notice that the Gaussian approximation also yields the same poor accuracy in the presence of dominant quantization noise.

However, we observe the following. An accuracy assessment of the receiver performance is more important at low or medium OSNR than at high OSNR. In this situation (e.g., OSNR≦16 dB and SGNR=∞), the parametric channel estimation with L=5 resolution achieves significantly better accuracy than the Gaussian approximation. The parametric estimate, unlike the Gaussian approximation, achieves good accuracy at high OSNR if the resolution is sufficiently high (e.g., L≧6).

3.D. Channel Estimation in the Presence of Realistic Filters

The previous analysis assumes that the filters are ideal (e.g., integrate-and-dump electrical filters) and that the ASE noise in the electrical domain is a chi-square random variable. However, it is known that the accuracy of the chi-square model for the ASE noise pdf may be poor in the presence of practical filters. Based on computer simulations, in the following, we explore the accuracy of the parametric channel estimator in IM/DD systems with realistic optical/electrical filters. The parametric channel estimator is satisfactory, even when realistic filters are considered. This can be inferred from the fact that in IM/DD optical systems with $r_{01} > 0$ and practical filters, (5) is still a good approximation for the pdf of the ASE noise in the electrical domain. Therefore, the models and assumptions used above are also valid.

In the following simulations, the parameters of the proposed expression for the pdf (16) are estimated from the sample moments of the input signal, as explained below. First, we consider a nondispersive optical channel: OOK NRZ modulation with $r_{10}$=13 dB, OSNR=15 dB, and SGNR=∞. We use a five-pole Bessel electrical filter with −3-dB bandwidth (3 dB-BW) of 7 GHz, and a Lorentzian optical filter with two −3-dB bandwidths: 10 and 20 GHz. It has been shown that results for any arbitrary optical-filter shape are generally between the Lorentzian and the ideal-rectangular filter.

FIGS. 9A-9B depict the pdf's of the received signal obtained from (16), from computer simulations, and from the Gaussian approximation. The number of samples used in the simulations is $5 \times 10^5$. The excellent accuracy of the parametric channel-estimation technique is verified. On the other hand, note that the Gaussian approximation fails in estimating the optimum-decision threshold, which would yield a significant performance degradation.

Figure 10:
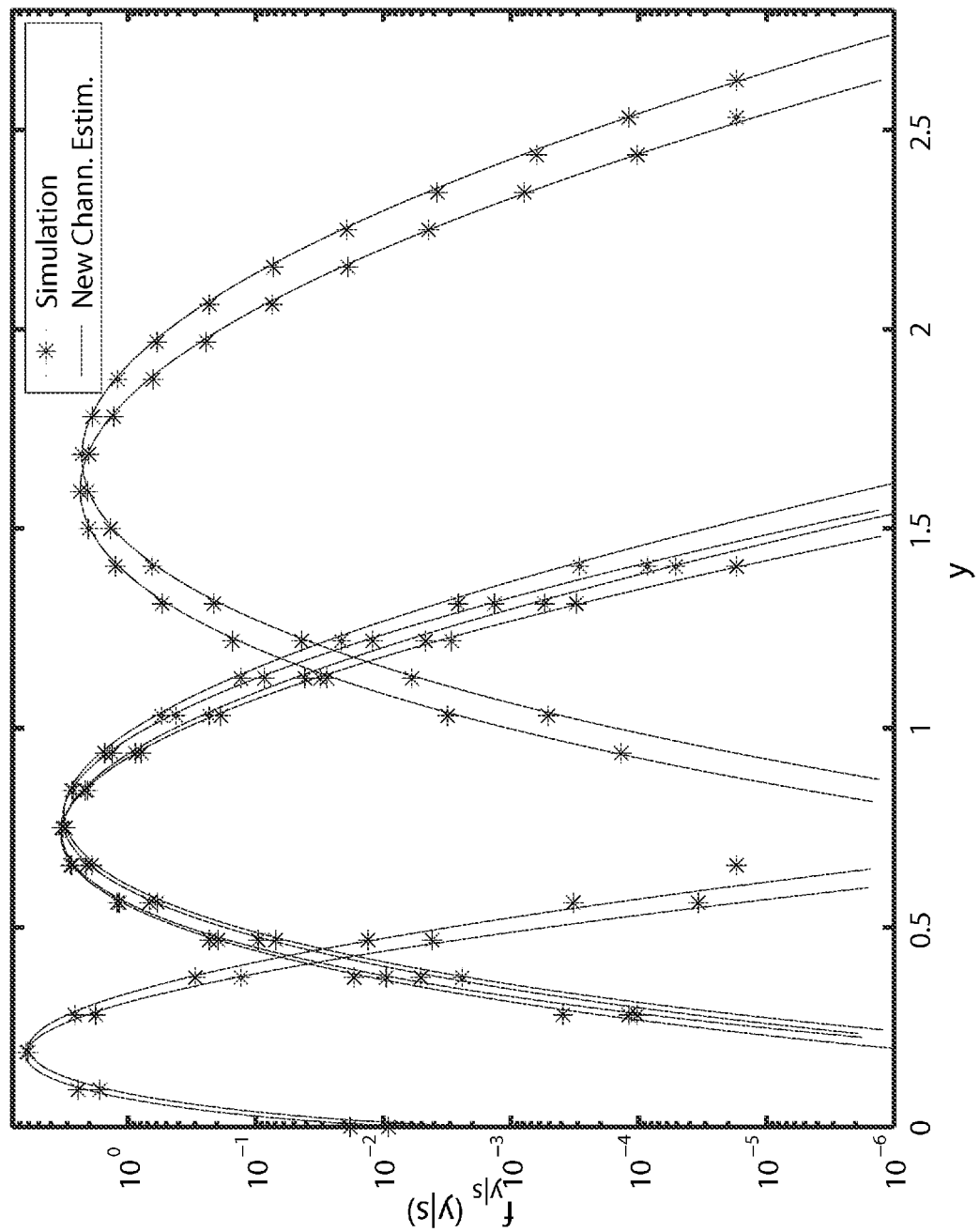
FIG. 10 is a further graph of signal pdf's according to the invention.

FIG. 10 shows results for a dispersive optical channel with D=1700 ps/nm, $r_{10}$=10 dB, four-state Viterbi decoder, SGNR=∞, OSNR=15 dB, and L=5. The signal samples at the output of the electrical filter are first quantized and then used to estimate the parameters of the pdf (16), as explained below. We use a five-pole Butterworth electrical filter with 3 dB-BW=7 GHz and a Lorentzian optical filter with 3 dB-BW=20 GHz. The number of samples used in the simulations is $5 \times 10^6$. Again, from FIG. 10, the good accuracy of the parametric channel estimation with realistic optical/electrical filters and finite-resolution analog-to-digital converters (ADCs) can be observed.

4. Performance of MLSE in IM/DD Optical Channels

Now consider the performance of MLSE in IM/DD optical channels based on the new generic functional form for the pdf (16). Because of the OOK modulation, a symbol error corresponds to exactly 1 bit error. Therefore, the probability of bit error of the Viterbi decoder is upper bounded by $$P_b \leq \sum_{\Psi \neq \hat{\Psi}} W_H(\Psi, \hat{\Psi}) Pr\{\hat{\Psi} \mid \Psi\} Pr\{\Psi\} \tag{36}$$

where $\Psi=\{a_n\}$ represents the transmitted sequence, $\hat{\Psi}=\{\hat{a}_n\}$ is an erroneous sequence, $Pr\{\hat{\Psi}|\Psi\}$ is the probability of the error event that occurs when the Viterbi decoder chooses sequence $\hat{\Psi}$ instead of $\Psi$), and $W_H(\Psi,\hat{\Psi})$ is the Hamming weight of $\Psi$ XOR $\hat{\Psi}$, in other words, the number of bit errors in the error event. $Pr\{\Psi\}$ is the probability that the transmitter sent sequence $\Psi$.

It is possible to show that $$Pr\{\hat{\Psi} \mid \Psi\} \simeq Q\left(\sqrt{\sum_{n=n_0}^{n_1+\delta-1} \frac{1}{\varsigma_{s_n}} \mid T_{s_n}(\overline{y}_n) - T_{s_n}(s_n)\mid^2}\right) \tag{37}$$

where $Q(x) = \frac{1}{2}\mathrm{erfc}(x/\sqrt{2})$, and $\overline{y}=(\overline{y}_1, \ldots, \overline{y}_N) \in L(s, \hat{s})$ is the vector such $\overline{u}=T_s(\overline{y})$ minimizes $F(u,s)$.

To compute an approximation to the receiver BER, (36) is used. As is common practice, the sum over error events in (36) is replaced by its largest terms, whose values are approximated using (37).

4.A. Closed-Form Approximation for the Error-Event Probability in Dispersive IM/DD Channels We can derive a simple analytical approximation assuming $T_{\hat{s}}(\bullet) = T_s(\bullet)$. From (37):

$$Pr\{\hat{\Psi} \mid \Psi\} \simeq Q\left(\sqrt{\sum_{n=n_0}^{n_1+\delta-1} \left|\frac{T_{s_n}(\hat{s}_n) - T_{s_n}(s_n)}{\sqrt{\varsigma_{s_n}} + \sqrt{\tilde{\varsigma}_{s_n}}}\right|^2}\right). \tag{38}$$

For Gaussian noise ($N_0$=0), from (25), we have $v_{\hat{s}_n} = v_{s_n} = 1$ and $\varsigma_{s_n} = \tilde{\varsigma}_{s_n} = \sigma_e^2 \forall s_n, \hat{s}_n \in S$. Therefore, (38) reduces to the well-known expression $$Pr\{\hat{\Psi} \mid \Psi\} \simeq Q\left(\frac{1}{2\sigma_e}\sqrt{\sum_{n=n_0}^{n_1+\delta-1} |\hat{s}_n - s_n|^2}\right). \tag{39}$$

For ASE noise ($\sigma_e$=0), from (25), we verify that $v_{\hat{s}_n} = v_{s_n} = 0.5$ and $\varsigma_{s_n} = \tilde{\varsigma}_{s_n} = N_0/2 \forall s_n, \hat{s}_n \in S$. Thus, from (44), we get $$Pr\{\hat{\Psi} \mid \Psi\} \simeq Q\left(\sqrt{\frac{1}{2N_0}\sum_{n=n_0}^{n_1+\delta-1} |\sqrt{\hat{s}_n} - \sqrt{s_n}|^2}\right). \tag{40}$$

For ASE noise ($\sigma_e$=0) and no dispersion ($2^\delta$=2), from (40), we obtain $$Pr\{\hat{\Psi} \mid \Psi\} \simeq Q\left(\sqrt{\frac{|\hat{s} - s|^2}{|\sqrt{2N_0 \hat{s}} + \sqrt{2N_0 s}|^2}}\right) \tag{41}$$

$$\simeq Q\left(\sqrt{\frac{|\hat{s} - s|^2}{|\sqrt{M_{2,\hat{s}}} + \sqrt{M_{2,s}}|^2}}\right).$$

Since $Q(x) \approx (1/\sqrt{2\pi}x)e^{-(1/2)x^2}$ and assuming that $\hat{s}$ and s are equiprobable, from (36) and (41), we get $$P_b = Pr\{\hat{\Psi} \mid \Psi\} \approx \frac{1}{\sqrt{2\pi} Q_P} e^{-\frac{1}{2}Q_P^2} \tag{42}$$

where $Q_P = |\hat{s} - s|/(\sqrt{M_{2,\hat{s}}} + \sqrt{M_{2,s}})$ is the well-known Q factor. The good accuracy of (42) has been verified when the intensity level for logical 0 does not vanish (e.g., $r_{01}$=0.1), and the OSNR is high (as we expressed above).

4.B. Numerical Results

We explore the accuracy of both the parametric channel estimation in MLSE-based receivers and the performance analysis developed in the previous section. We present results for OOK RZ modulation. Data rate is 10 Gb/s. The transmitted pulse shape has an unchirped Gaussian envelope exp$(-t^2/2T_0^2)$ with $T_0$=36 ps. We focus on IM/DD optical channels with combined Gaussian and ASE noise. Channel estimation for these links has been reported only for the case of ideal filters. Therefore, in order to compare the parametric approach with previous work, ideal rectangular optical and integrate-and-dump electrical filters are considered in this section. It is important to realize, however, that results not included here for the case of realistic optical/electrical filters have shown that the parametric approach achieves similar accuracy to that presented here.

Figures 11A, 11B, 11C:
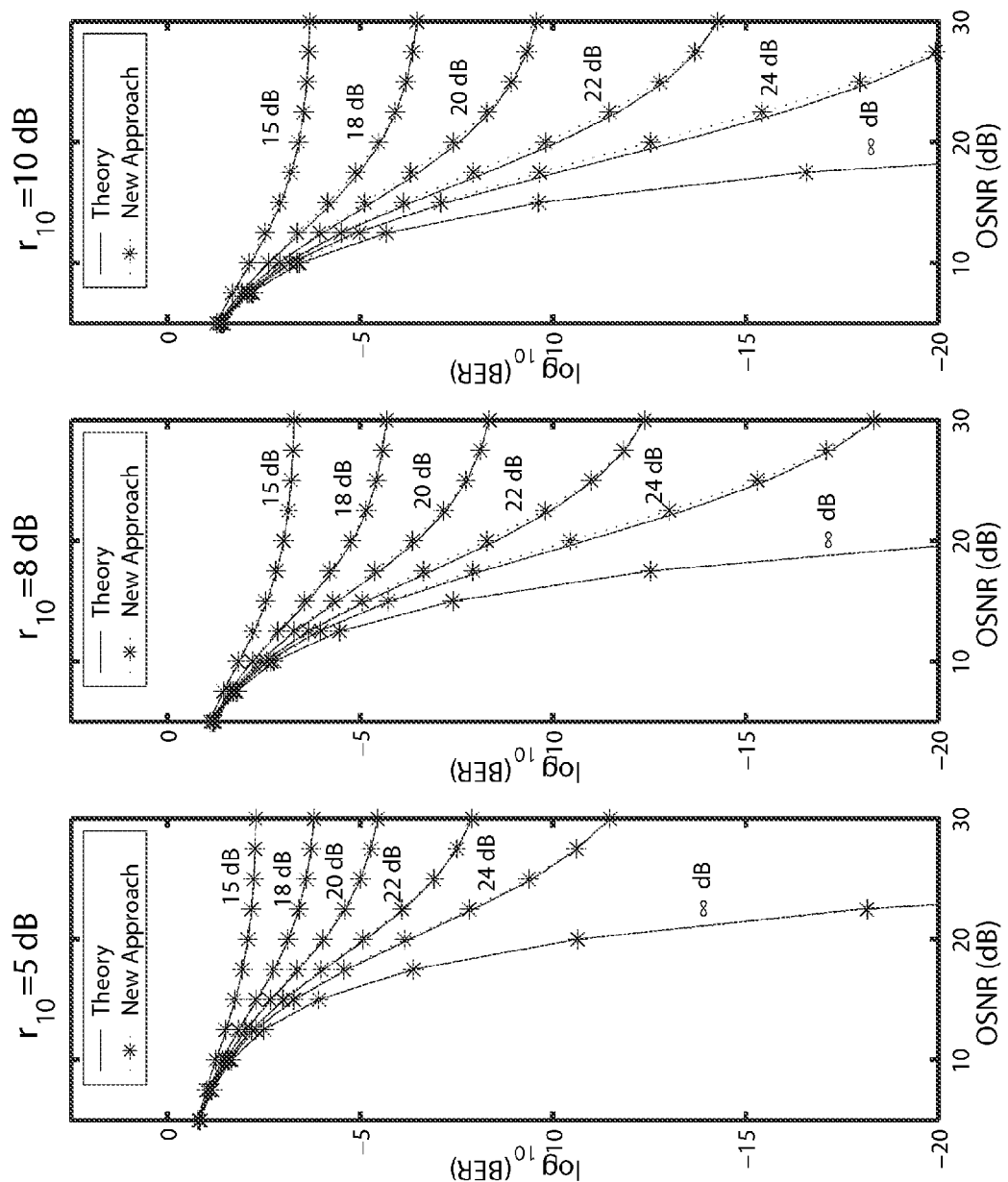
FIGS. 11A-11C are graphs of log(BER) as a function of OSNR, for various values of SGNR and $r_{10}$.

FIGS. 11A-11C shows the BER versus OSNR in a nondispersive optical channel for M=3 and different values of SGNR and $r_{10}$. We present values derived from both the chi-square pdf's (solid lines) and the new approach based on (38) ("*"). Function parameters are estimated as above. In all cases, we verify the excellent accuracy of the values obtained from the performance analysis developed here.

Figure 12B:
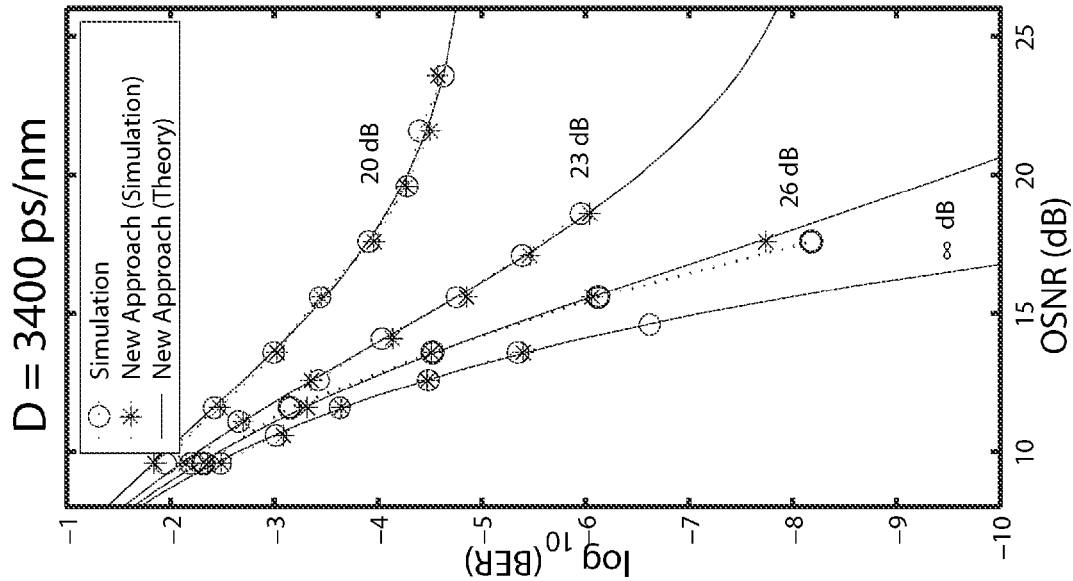
FIGS. 12A-12B are graphs of log(BER) as a function of OSNR, for various values of SGNR and D.
Figure 12A:
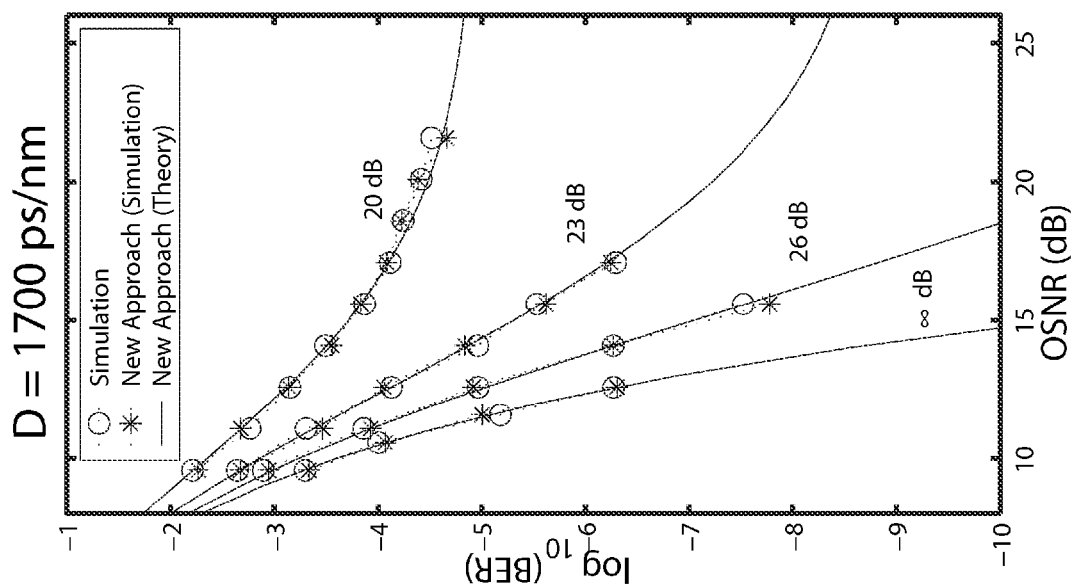
Figure 13A:
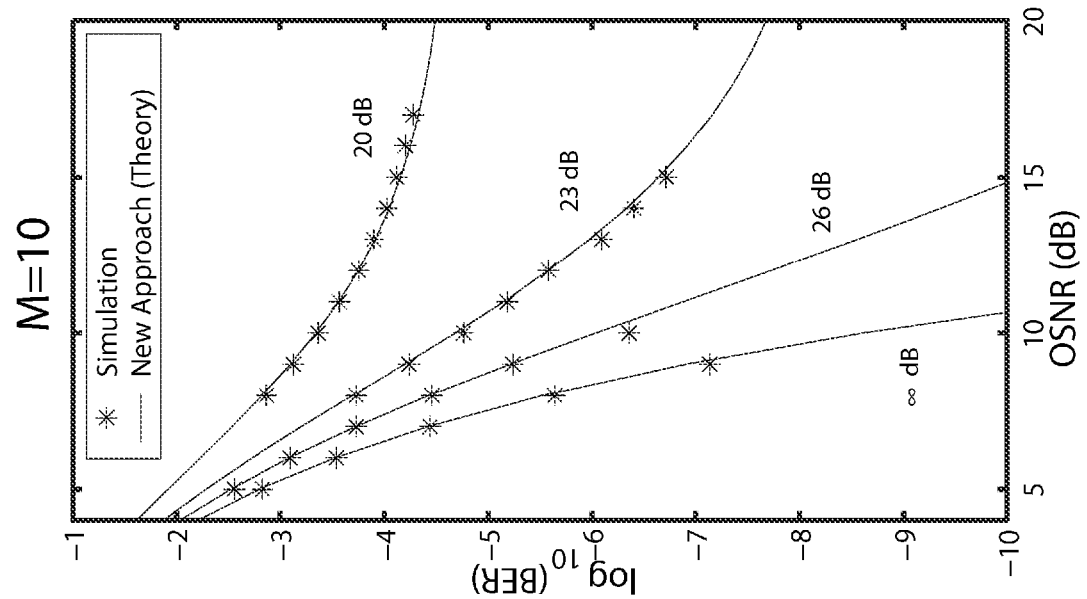
FIGS. 13A-13B are graphs of log(BER) as a function of OSNR, for various values of SGNR and M.
Figure 13B:
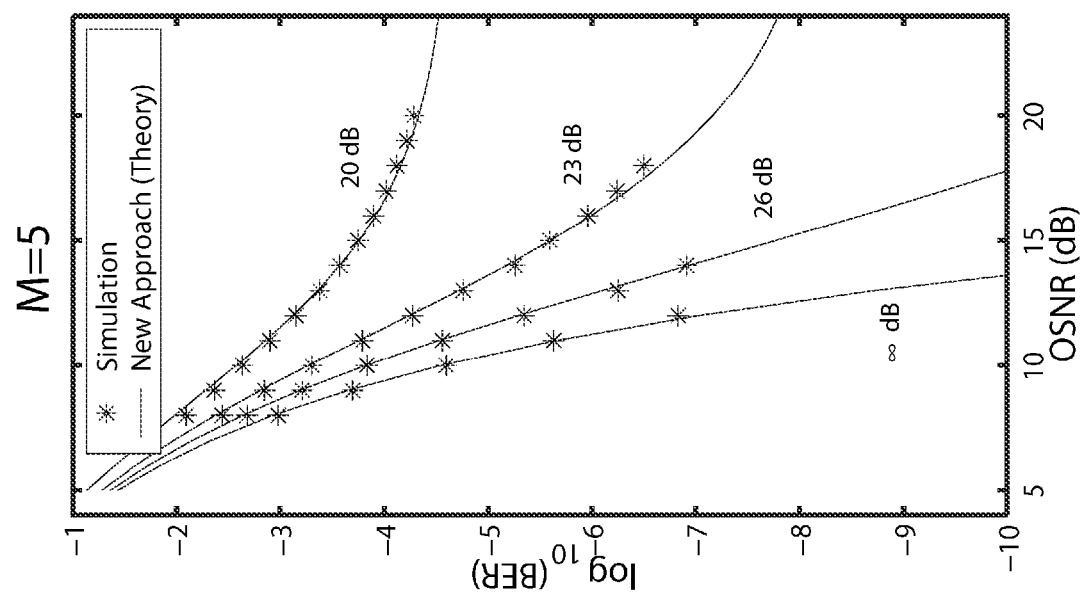

Next, we analyze two optical channels with D=1700 and D=3400 ps/nm. The MLSE receiver has enough states to compensate the total memory of the channel (i.e., four- and 16-state Viterbi decoders for D=1700 and D=3400 ps/nm, respectively). Exact knowledge of the channel impulse response is assumed. FIGS. 12A-12B shows BER versus OSNR for different values of SGNR with M=3 and $r_{10}$=10 dB. We compare results from computer simulation for the receiver that uses 1) the metric computation based on the iterative procedure proposed in "Calculation of bit-error probability for a lightwave system with optical amplifiers and post-detection Gaussian noise," J. Lightwave Technology, vol. 8 no. 12, previously presented. 505-513, April 1991; and 2) the metric defined by (17) with $T_s(\bullet)$ approximated by (21). Parameters are obtained from the channel estimator described above. Note the excellent agreement between values obtained from the simplified metric ("*") and the iterative procedure ("o"). FIG. 12 also depicts theoretical bounds derived from (36) and (38) (solid lines). In this case, we use the terms in summation (36) that correspond to error events with $W_H(\Psi, \hat{\Psi}) \leq 4$. In FIGS. 13A-13B, we show results for M=5 and M=10 with $r_{10}$=8 dB, D=1700 ps/nm, and four-state Viterbi decoder. In all cases, comparisons between the values derived from theory and simulations confirm the good accuracy of the analytical predictions based on (38).

5. Example Implementations

As described previously, the problem of channel estimation is important in the implementation of MLSE-based EDC receivers. One advantage of the parametric channel estimator described above is that it results in a significant complexity reduction for the receiver. Note that the parametric estimation technique can also be used to provide a priori knowledge in combination with the histogram method.

Figure 14:
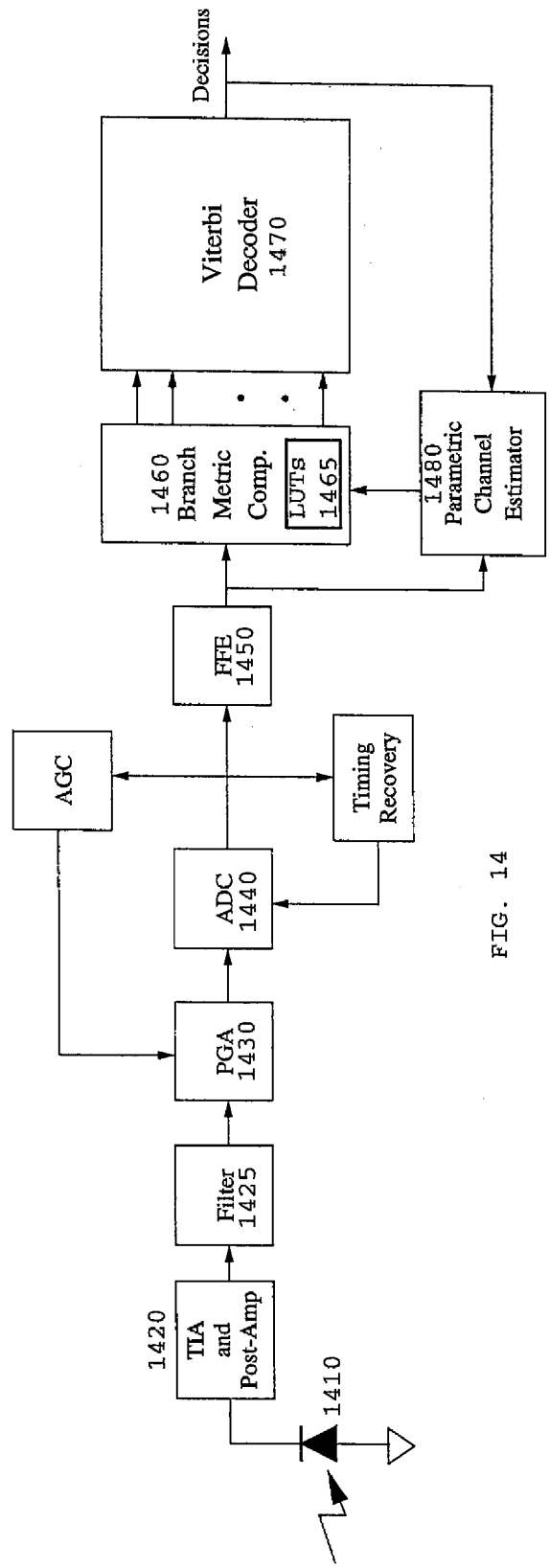
FIG. 14 is a block diagram of an MLSE receiver according to the present invention.

The implementation that can make EDC most viable commercially is currently a digital monolithic integrated circuit in complementary metal oxide semiconductor (CMOS) technology. FIG. 14 shows a simplified block diagram of an EDC receiver for IM/DD optical channels at a data rate of 10 Gb/s. Although the A/D converter may use an interleaved architecture and the DSP may use parallel processing, for simplicity, these details are omitted in FIG. 14. The optical signal is converted to a current by a p-i-n or avalanche photodetector 1410, and the resulting photocurrent is amplified and converted to a voltage by a transimpedance amplifier 1420 and a linear postamplifier 1420. The resulting signal is low-pass filtered 1425 and level-adjusted by a programmable gain amplifier 1430 and then converted to a digital representation by the A/D converter 1440. Then, the signal is equalized by a feedforward equalizer 1450 and passed to the branch-metric computation unit 1460. In some single-mode fiber applications where the amount of dispersion is limited, the FFE 1450 may be omitted.

Note that in the following example, referring to (1), the received signal $y_n$ is the input to the branch-metric computation unit (which is also the FFE output in this case), and the various noise sources and the "channel" account for all effects from the transmitter through the optical fiber and including receiver effects prior to the branch-metric computation unit. The transmitted bit sequence $a_n$ hopefully is recovered by the decisions of the Viterbi decoder 1470.

Branch metrics can be efficiently computed using lookup tables (LUTs) 1465. This assumes that the signal at the input of the Viterbi decoder 1470 can be quantized to a relatively low resolution so that the size of the LUTs is reasonable. This assumption is valid in many practical cases. For example, an MLSE-based receiver capable of compensating the chromatic dispersion and polarization mode dispersion of up to 300 km of SSMF requires a resolution of about L=6 bits for this signal. In this case, the branch-metric LUTs 1465 have 64 entries per branch, a size quite manageable in current CMOS technology. The contents of the LUTs 1465 are channel-dependent and possibly also time-dependent. This is the case, for example, of a single-mode fiber receiver that operates in the presence of polarization mode dispersion. Therefore, the LUTs 1465 preferably are implemented in random-access memory.

The function of the channel-estimator is to compute the contents of the LUTs 1465. To keep track of changes in the channel, the LUTs 1465 must be refreshed periodically. If the channel-estimation is based on a closed-form parametric approach (such as (22)), the channel-estimator will be referred to as a parametric channel-estimator 1480.

In the example described above, the parametric channel-estimator 1480 updates the LUTs 1265 according to the process shown in FIG. 15. In this example, the parametric channel-estimator 1480 is based on (22). In step 1510, the parametric channel-estimator 1480 estimates the parameters for the received signal pdf based on the received samples. In this particular example, the received samples are $y_n$, the inputs to the branch metric computation unit 1460. The parameters for (22) are $v_s$, $\zeta_s$ and $\bar{u}_s$. These parameters can be calculated for all signal levels s from the received samples $y_n$ using the method of moments, specifically using (24), (26) and (27) above. In step 1520, the estimated parameters are used to evaluate the generic nonlinear transformation $T_s(y)$ for each input value $y_n$ and each signal level s. In step 1530, branch metrics are computed based on the transformed signal $T_s(y)$. In the implementation of FIG. 14, the parametric channel estimator 1480 updates the LUTs 1465 based on the transformed signal $T_s(y)$. The parametric channel estimator 1480 preferably is implemented by firmware or software executing on an embedded processor, although it could also be implemented by other types of hardware and/or software.

Because channel-estimation algorithms are not very regular, they usually do not lend themselves well to be implemented in dedicated hardware. They are usually better implemented in firmware running on a general-purpose embedded processor. However, even a relatively fast processor can run out of time if a complicated channel-estimation algorithm is used. This would be the case, for example, for algorithms based on iterative solutions of equations. It is important to realize that the complexity of the channel-estimation algorithm grows when additional sources of noise, such as quantization noise, are taken into account. Thus, it is clear that the computational load of 1) the estimation of the pdf signal parameters and 2) the refresh of the branch-metric LUTs constitutes an important aspect of the design of the Viterbi decoder that affects its implementation complexity and even its technical viability.

5.A. Practical Implementation Using the Method of Moments

To implement the parametric channel estimates of (22), estimates of $v_s$, $\zeta_s$, and s (or $\bar{u}_s$) are generally required for all $2^\delta$ branches in the trellis. In the presence of quantization noise, parameters $v_s$ can be expressed in terms of the moments of the smooth pdf (35). It has been shown that their values can be accurately approximated by the moments of the quantized output y' if the resolution is sufficiently high (e.g., L>4 for the application considered above). Therefore, in practical implementation (i.e., realistic filters, finite-resolution A/D converters, etc.), the central moments required to evaluate $v_s$ can be directly estimated from the sample moments of the received quantized samples y'.

Once the $2^\delta$ values of $v_s$ are estimated, from (10) through (16), we verify that the rest of the parameters required for metric computations reduce to means and variances of the random variable $y_n^{v_s}$. These parameters can be 1) derived from (13) and (14) with $T_s(y)=y^{v_s}$ or 2) estimated from the sample moments:

$$\bar{u}_s = E_s\{y_n^{v_s}\} \qquad (43)$$
$$\approx \frac{1}{N_m} \sum_{k=n}^{n+N_m-1} y_k^{v_s}$$

$$\varsigma_s = E_s\{(y_n^{v_s} - \bar{u}_s)^2\} \qquad (44)$$
$$\approx \left(\frac{1}{N_m} \sum_{k=n}^{n+N_m-1} (y_k^{v_s})^2\right) - \bar{u}_s^2, s \in S.$$

In practical implementations on integrated circuits, the function $y^{v_s}$ is efficiently computed using LUTs, which can be generated from the $N_v$-order Taylor's expansion of $y^{v_s}$ given by $$y^{v_s} \approx 1 + \sum_{k=1}^{N_v} \frac{1}{k!}(v_s \ln(y))^k. \qquad (45)$$

Further simplification can be achieved by using well-known function-evaluation techniques. For example, if we write $v_s = v_{ref} + v_{d,s}$, then $y^{v_s} = y^{v_{ref}} y^{v_{d,s}}$. If we tabulate $y^{v_{ref}}$, then the size of $v_{d,s}$ can be reduced. Thus, only a few terms of the series are needed to evaluate $y^{v_{d,s}}$. In particular, we have found that $$y^{v_s} \approx y^{v_{ref}}\left[1 + v_{d,s}\ln(y) + \frac{1}{2}(v_{d,s}\ln(y))^2\right] \qquad (46)$$

with $v_{ref}=0.7$ providing excellent accuracy for the $v_s$ range of interest in the application considered above (i.e., $v_s \in (0.3,1]$). The sets of $2^L$ values for $\ln(y)$ and $y^{v_{ref}}$ can be stored in read-only memory (ROM), and thus, the $2^\delta$ LUTs (one for each $v_s$) can be easily generated from (46). Note that this operation can proceed at a low speed. Therefore, it can be carried out by an embedded general-purpose processor. Once the $2^\delta$ LUTs with $2^L$ words for $y^{v_s}$ are generated, the $2^\delta$ values of $\bar{u}_s$ and $\varsigma_s$ can be easily calculated.

Estimators of IM/DD optical channels proposed in the past are based on the method of steepest descent. Comparisons of computational complexity indicate that the parametric approach described above requires approximately 5% of the computational load required by the steepest descent approach. Consider an eight-state Viterbi decoder with L=6 resolution bits. Taking into account that typical performance of embedded general-purpose processors allowed by current technology (e.g., 90-nm CMOS process) is in the 500-900 MIPS range, it is concluded that the implementation of channel estimators based on the steepest descent method is seriously limited. On the other hand, we verify that the parametric channel estimator proposed above could be easily implemented by using current technology. The parametric approach is very attractive for practical implementations of high-speed MLSE-based IM/DD receivers in integrated circuits in CMOS technology.

6. Further Examples

The examples described above were based on IM/DD optical channels. This example was chosen partly because there is currently significant interest in this application. It was chosen also partly because certain principles are more easily described using a specific example. However, the invention is not limited to this particular example. The principles can be extended to communications channels other than IM/DD optical channels.

Other examples include read channels for magnetic recording. Other channels where there may be a mix of Gaussian and non-Gaussian noise are channels subject to crosstalk. Crosstalk, in general, does not have a Gaussian distribution. Some examples of channels that suffer from crosstalk, in addition to other forms of noise, are twisted pair channels, such as those specified by the IEEE standards 1000BASE-T and 10GBASE-T, the channel specified by the SFP+ standard, DWDM optical channels where nonlinear intermodulation effects among different wavelengths (including four-wave mixing and cross-phase modulation) result in optical crosstalk coupling to the channel of interest, etc. Another important example of non-Gaussian noise is cochannel interference in wireless channels. In these cases, the receiver also operates in the presence of a mixture of Gaussian and non-Gaussian noise. In these examples, the specific closed-form parametric expression (22) may not be applicable, but the general approach described above based on nonlinear transformation $T_s(y)$ may result in other useful closed-form parametric expressions.

As another example, receivers using the approach described above are not required to use a Viterbi decoder or to expressly calculate branch metrics. The decision-feedback equalizer (DFE), the maximum a posteriori (MAP) decoder, and iterative decoding receivers are examples of non-Viterbi decoders that can benefit from a closed-form parametric model of the channel.

Finally, the various components shown in block diagrams are not meant to be limited to a specific physical form. Depending on the specific application, they can be implemented as hardware, firmware, software, and/or combinations of these. In addition, the "coupling" between components may also take different forms. Dedicated circuitry can be coupled to each other by hardwiring or by accessing a common register or memory location, for example. Software "coupling" can occur by any number of ways to pass information between software components (or between software and hardware, if that is the case). The term "coupling" is meant to include all of these and is not meant to be limited to a hardwired permanent connection between two components. In addition, there may be intervening elements. For example, when two elements are described as being coupled to each other, this does not imply that the elements are directly coupled to each other nor does it preclude the use of other elements between the two.

Although the detailed description contains many specifics, these should not be construed as limiting the scope of the invention but merely as illustrating different examples and aspects of the invention. It should be appreciated that the scope of the invention includes other embodiments not discussed in detail above. Various other modifications, changes and variations which will be apparent to those skilled in the art may be made in the arrangement, operation and details of the method and apparatus of the present invention disclosed herein without departing from the spirit and scope of the invention as defined in the appended claims. Therefore, the scope of the invention should be determined by the appended claims and their legal equivalents.

What is claimed is:

1. A receiver for determining a received bit sequence based on a received signal transmitted to the receiver over a channel, the receiver comprising:

a parametric channel-estimator that provides a channel-estimate based on a closed-form parametric model of the channel, the parametric channel-estimator estimating parameters for the parametric model based on the received signal, wherein the closed-form parametric model of the channel is based on a nonlinear transformation $T_s(y)$ as defined in the following equation:

$$u = T_s(y) = F_{u|s}^{(-1)}(F_{y|s}(y)),$$

where s is a noise-free signal, u is a Gaussian random variable, $T_s$ is a transformation function, y is a random variable representing a received input symbol, $F_{u|s}(\cdot)$ is a cumulative distribution function of u when the noise-free signal s is received, $F_{y|s}(\cdot)$ is a cumulative distribution function of y when the noise-free signal s is received; and a decoder coupled to the parametric channel-estimator, the decoder determining the received bit sequence based in part on the channel-estimate from the parametric channel-estimator.

2. The receiver of claim 1 where there is no closed-form exact model of the channel.

3. The receiver of claim 1 wherein the closed-form parametric model of the channel is based on the following equation:

$$f_{y|s}(y \mid s) = \frac{1}{\sqrt{2\pi\varsigma_s}} e^{-\frac{1}{2\varsigma_s}[T_s(y) - \overline{u}_s]^2} T_s'(y), \forall y.$$

wherein $f_{y|s}(y|s)$ is a probability density function for a received signal y given a noise free signal s, u is a Gaussian random variable such that $u = T_s(y) = F_{u|s}^{(-1)}(F_{y|s}(y))$ where $T_s(y)$ is a transformation function for transforming y to u, $F_{u|s}(\cdot)$ is a cumulative distribution function of u when a noise-free signal s is received, $F_{y|s}(\cdot)$ is a cumulative distribution function of y when the noise-free signal s is received, $T_s'(y) = dT_s(y)/dy$, $\overline{u}_s$ is the mean of u, and $\varsigma_s$ is a variance of u.

4. The receiver of claim 1 wherein the closed-form parametric model of the channel is based on the following equation:

$$f_{y|s}(y \mid s) \approx \frac{1}{\sqrt{2\pi M_{2,s}}} e^{-\frac{1}{2\varsigma_s}[T_s(y) - T_s(s)]^2} s \in S$$

wherein $f_{y|s}(y|s)$ is a probability density function for a received signal y given a noise free signal s, $T_s(\cdot)$ is a transformation function for transforming y to a Gaussian random variable u as $u = T_s(y) = F_{u|s}^{(-1)}(F_{y|s}(y))$ where $F_{u|s}(\cdot)$ is a cumulative distribution function of u when a noise-free signal s is received, and $F_{y|s}(\cdot)$ is a cumulative distribution function of y when the noise-free signal s is received, $\varsigma_s$ is a variance of u and $M_{2,s}$ is a conditional second-order central moment of y.

5. The receiver of claim 1 wherein the parameters include $\{v_s\}$ and $\{\varsigma_s\}$ with s∈S, wherein $\varsigma_s$ is a variance of a Gaussian random variable and wherein $v_s$ is in a range $0 < v_s \leq 1$.

6. The receiver of claim 5 wherein the parametric model is defined by $$f_{y|s}(y \mid s) = \frac{v_s s^{(v_s-1)}}{\sqrt{2\pi\varsigma_s}} e^{-\frac{1}{2\varsigma_s}(y^{v_s} - s^{v_s})^2},$$

s∈S wherein $f_{y|s}(y|s)$ is a probability density function for a received signal y given a noise free signal s, $\varsigma_s$ is a variance of a Gaussian random variable, and wherein $v_s$ is in a range $0 < v_s \leq 1$.

7. The receiver of claim 5 wherein the parametric channel-estimator estimates $\{v_s\}$ and $\{\varsigma_s\}$, wherein $\{v_s\}$ is a value that minimizes a third order central moment of a Gaussian random variable, and wherein $\varsigma_s$ approximates a variance of the Gaussian random variable.

8. The receiver of claim 1 wherein the channel includes non-Gaussian noise.

9. The receiver of claim 1 wherein the channel includes ASE noise.

10. The receiver of claim 1 wherein the channel includes quantization noise.

11. The receiver of claim 1 wherein the channel includes signal-dependent noise.

12. The receiver of claim 1 wherein the channel is subject to crosstalk.

13. The receiver of claim 1 wherein the channel includes nonlinear intermodulation effects among different wavelengths within the channel.

14. The receiver of claim 1 wherein the channel includes cochannel interference.

15. The receiver of claim 1 wherein the parametric model is sufficiently accurate to account for at least two different types of noise.

16. The receiver of claim 15 wherein the parametric model is sufficiently accurate to account for Gaussian noise and to account for ASE noise.

17. The receiver of claim 1 wherein the channel includes an optical fiber and the bit sequence is transmitted at a speed of at least 1 Gb/s.

18. The receiver of claim 1 wherein the channel includes an optical fiber and the bit sequence is transmitted at a speed of at least 10 Gb/s.

19. The receiver of claim 18 wherein the channel suffers from chromatic dispersion and polarization-mode dispersion.

20. The receiver of claim 19 wherein the channel has dispersion of at least 1200 ps/nm.

21. The receiver of claim 18 wherein the received signal is transmitted using an intensity-modulation/direct-detection system.

22. The receiver of claim 21 wherein the received signal uses on-off keying modulation.

23. The receiver of claim 1 wherein the receiver is an MLSE receiver.

24. The receiver of claim 1 wherein the decoder is a Viterbi decoder.

25. The receiver of claim 1 wherein the decoder includes a decision feedback equalizer (DFE).

26. The receiver of claim 1 wherein the decoder is a maximum a posteriori (MAP) decoder.

27. The receiver of claim 1 wherein the receiver is an iterative decoding receiver.

28. The receiver of claim 1 further comprising:
a branch-metric computation unit coupled to the parametric channel-estimator, the branch-metric computation unit determining branch metrics for each of the possible received bit sequences based in part on the channel-estimate from the parametric channel-estimator; wherein the decoder determines the received bit sequence based in part on the branch metrics from the branch-metric computation unit.

29. The receiver of claim 28 wherein the branch-metric computation unit comprises a plurality of lookup tables for determining the branch metrics and the parametric channel-estimator updates the lookup tables based on the parametric model and the estimated parameters.

30. The receiver of claim 1 further comprising:
an equalizer coupled to the branch-metric computation unit, that provides the received signal to the branch-metric computation unit.

31. The receiver of claim 1 wherein the parametric channel-estimator, branch-metric computation unit and decoder are implemented as a single CMOS integrated circuit.

32. The receiver of claim 1 wherein the parametric channel-estimator, branch-metric computation unit and decoder are implemented as a single DSP integrated circuit.

33. The receiver of claim 1, wherein the receiver comprises a direct detection receiver.

34. The receiver of claim 1, wherein $T_s(y)$ is approximated by $y^{v_s}$ where $0 < v_s \leq 1$.

35. The receiver of claim 34, wherein $v_s = 0.5$.

36. A method for determining a received bit sequence based on a received signal transmitted over a channel, the method comprising:
modeling the channel using a closed-form parametric model defined by parameters, wherein the closed-form parametric model of the channel is based on a nonlinear transformation $T_s(y)$ as defined in the following equation:
$u = T_s(y) = F_{u|s}^{(-1)}(F_{y|s}(y))$, where s is a noise-free signal, u is a Gaussian random variable, $T_s$ is a transformation function, y is a random variable representing a received input symbol, $F_{u|s}(\bullet)$ is a cumulative distribution function of u when the noise-free signal s is received, $F_{y|s}(\bullet)$ is a cumulative distribution function of y when the noise-free signal s is received;
estimating the parameters for the parametric model based on the received signal, thereby providing a channel-estimate;
determining the received bit sequence based in part on the channel-estimate.

37. The method of claim 36, wherein the closed-form parametric model of the channel is based on the following equation:

$$f_{y|s}(y|s) = \frac{1}{\sqrt{2\pi\zeta_s}} e^{-\frac{1}{2\zeta_s}[T_s(y)-\bar{u}_s]^2} T_s'(y), \forall y.$$

wherein $f_{y|s}(y|s)$ is a probability density function for a received signal y given a noise free signal s, u is a Gaussian random variable such that $u = T_s(y) = F_{u|s}^{(-1)}(F_{y|s}(y))$ where $T_s(y)$ is a transformation function for transforming y to u, $F_{u|s}(\bullet)$ is a cumulative distribution function of u when a noise-free signal s is received, $F_{y|s}(\bullet)$ is a cumulative distribution function of y when the noise-free signal s is received, $T_s'(y) = dT_s(y)/dy$, $\bar{u}_s$ is the mean of u, and $\zeta_s$ is a variance of u.

38. The method of claim 36 wherein the closed-form parametric model of the channel is based on the following equation:

$$f_{y|s}(y|s) \approx \frac{1}{\sqrt{2\pi M_{2,s}}} e^{-\frac{1}{2\zeta_s}[T_s(y)-T_s(s)]^2} s \in S$$

wherein $f_{y|s}(y|s)$ is a probability density function for a received signal y given a noise free signal s, $T_s(\bullet)$ is a transformation function for transforming y to a Gaussian random variable u as $u = T_s(y) = F_{u|s}^{(-1)}(F_{y|s}(y))$ where $F_{u|s}(\bullet)$ is a cumulative distribution function of u when a noise-free signal s is received, and $F_{y|s}(\bullet)$ is a cumulative distribution function of y when the noise-free signal s is received, $\zeta_s$ is a variance of u and $M_{2,s}$ is a conditional second-order central moment of y.

39. The method of claim 36 wherein the parameters include $\{v_s\}$ and $\{\zeta_s\}$ with $s \in S$, wherein $\zeta_s$ is a variance of a Gaussian random variable and wherein $v_s$ is in a range $0 < v_s \leq 1$.

40. The method of claim 39 wherein the parametric model is defined by $$f_{y|s}(y|s) = \frac{v_s s^{(v_s-1)}}{\sqrt{2\pi\zeta_s}} e^{-\frac{1}{2\zeta_s}(y^{v_s}-s^{v_s})^2},$$

$s \in S$ wherein $f_{y|s}(y|s)$ is a probability density function for a received signal y given a noise free signal s, $\zeta_s$ is a variance of a Gaussian random variable, and wherein $v_s$ is in a range $0 < v_s \leq 1$.

41. The method of claim 36, further comprising receiving the received signal using a direct detection receiver.

42. The method of claim 36, wherein $T_s(y)$ is approximated by $y^{v_s}$ where $0 < v_s \leq 1$.

43. The method of claim 42, wherein $v_s = 0.5$.

* * * * *